US010873762B2

(12) United States Patent
Zhao et al.

(10) Patent No.: US 10,873,762 B2
(45) Date of Patent: Dec. 22, 2020

(54) NON-SEPARABLE SECONDARY TRANSFORM FOR VIDEO CODING

(71) Applicant: QUALCOMM Incorporated, San Diego, CA (US)

(72) Inventors: Xin Zhao, Santa Clara, CA (US); Jianle Chen, San Diego, CA (US); Amir Said, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/692,286

(22) Filed: Nov. 22, 2019

(65) Prior Publication Data
US 2020/0092583 A1 Mar. 19, 2020

Related U.S. Application Data

(63) Continuation of application No. 15/270,455, filed on Sep. 20, 2016, now Pat. No. 10,491,922.

(51) Int. Cl.
H04N 19/61 (2014.01)
H04N 19/18 (2014.01)
(Continued)

(52) U.S. Cl.
CPC ............ H04N 19/61 (2014.11); H04L 43/16 (2013.01); H04N 1/32181 (2013.01);
(Continued)

(58) Field of Classification Search
CPC ........ H04N 19/61; H04N 19/18; H04N 19/12; H04N 19/124; H04N 19/159;
(Continued)

(56) References Cited

U.S. PATENT DOCUMENTS 9,215,470 B2 12/2015 Karczewicz et al.
2008/0310504 A1* 12/2008 Ye .................... H04N 19/593
375/240.02
(Continued)

FOREIGN PATENT DOCUMENTS

| EP | 2464013 A1 | 6/2012 |
| WO | WO-2011016246 A1 | 2/2011 |
| WO | WO-2012006574 | 1/2012 |

OTHER PUBLICATIONS

Prosecution History for U.S. Appl. No. 15/270,455 dated from Sep. 25, 2018 through Jul. 15, 2019, 44 pages.
(Continued)

Primary Examiner — Nam D Pham
(74) Attorney, Agent, or Firm — John Rickenbrode

(57) ABSTRACT

Techniques are described in which a decoder is configured to inverse quantize a first coefficient block and apply a first inverse transform to at least part of the inverse quantized first coefficient block to generate a second coefficient block. The first inverse transform is a non-separable transform. The decoder is further configured to apply a second inverse transform to the second coefficient block to generate a residual video block. The second inverse transform converts the second coefficient block from a frequency domain to a pixel domain. The decoder is further configured to form a decoded video block, wherein forming the decoded video block comprises summing the residual video block with one or more predictive blocks.

19 Claims, 15 Drawing Sheets

Related U.S. Application Data

(60) Provisional application No. 62/337,736, filed on May 17, 2016, provisional application No. 62/323,496, filed on Apr. 15, 2016, provisional application No. 62/294,897, filed on Feb. 12, 2016, provisional application No. 62/234,644, filed on Sep. 29, 2015.

(51) Int. Cl.

| | |
|---|---|
| *H04N 19/12* | (2014.01) |
| *H04N 19/124* | (2014.01) |
| *H04N 19/159* | (2014.01) |
| *H04N 19/176* | (2014.01) |
| *H04N 19/625* | (2014.01) |
| *H04N 1/32* | (2006.01) |
| *H04N 19/122* | (2014.01) |
| *H04L 12/26* | (2006.01) |
| *H04N 19/182* | (2014.01) |

(52) U.S. Cl.
CPC .......... *H04N 19/12* (2014.11); *H04N 19/122* (2014.11); *H04N 19/124* (2014.11); *H04N 19/159* (2014.11); *H04N 19/176* (2014.11); *H04N 19/18* (2014.11); *H04N 19/625* (2014.11); *H04N 19/182* (2014.11)

(58) Field of Classification Search
CPC ............... H04N 19/176; H04N 19/625; H04N 1/32181; H04N 19/122; H04N 19/182; H04L 43/16

See application file for complete search history.

(56) References Cited

U.S. PATENT DOCUMENTS

| | | |
|---|---|---|
| 2008/0310512 A1 | 12/2008 | Ye et al. |
| 2012/0008675 A1 | 1/2012 | Karczewicz et al. |
| 2012/0134412 A1 | 5/2012 | Shibahara et al. |
| 2015/0326883 A1 | 11/2015 | Rosewarne et al. |
| 2016/0219283 A1 | 7/2016 | Chen et al. |
| 2016/0219290 A1 | 7/2016 | Zhao et al. |
| 2017/0094313 A1 | 3/2017 | Zhao et al. |
| 2017/0094314 A1 | 3/2017 | Zhao et al. |

OTHER PUBLICATIONS

Prosecution History for U.S. Appl. No. 15/270,507 dated from Sep. 21, 2018 through Feb. 5, 2020, 145 pages.

Alshina E., et al., "CE7: Experimental results of ROT by Samsung," Joint Collaborative Team on Video Coding (JCT-VC) of ITU-T SG16 WP3 and ISO/IEC JTC1/SC29/WG11, 5th Meeting, Document No. JCTVC-E380, Mar. 17, 2011, 10 pp.

Alshina E., et al., "Known tools performance investigation for next generation video coding", 52nd Meeting, Jun. 19 through 26, 2015, Warsaw, Poland; ITU-Telecommunications Standarization Sector Study Group 16 Question 6 Video Coding Experts Group (VCEG), VCEG-AZ05, Jun. 18, 2015, 5 pp.

An, et al., "Boundary-Dependent Transform for Inter-Predicted Residue," JCTVC-G281, PowerPoint presentation, 7th JCTVC Meeting, Geneva, CH, Nov. 21-30, 2011, 12 slides.

Chen, et al., "Preliminary version of High efficiency video coding (HEVC) scalable extension Draft 6," Joint Collaborative Team on Video Coding (JCT-VC) of ITU-T SG 16 WP 3 and ISO/IEC JTC 1, Document: JCTVC-Q1008v2, Mar. 27-Apr. 4, 2014, 160 pp.

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC 1/SC 29/WG 11 and ITU-T SG.16 ); URL: http://phenix.int-evry.fr/jvet/,, No. JVET-A1001 Feb. 24, 2016 (Feb. 24, 2016), XP030150000, 27 pages.

Egilmez H.E, et al., "Non-CE6: An MTS-based Restriction for LFNST beyond Transform Skip", Joint Video Experts Team (JVET) of ITU-T SG 16 WP 3 and ISO/IEC JTC 1/SC 29/WG 11, JVET-O0368-v4, 15th Meeting: Gothenburg, SE, Jul. 3-12, 2019, 7 pages.

Han J., et al., "Towards jointly optimal spatial prediction and adaptive transform in video/image coding," IEEE International Conference on Acoustics, Speech and Signal Processing (ICASSP), pp. 726-729 (Mar. 2010).

International Preliminary Report on Patentability from PCT Application Serial No. PCT/US2016/052926 dated Dec. 7, 2017 (23 pages).

International Preliminary Report on Patentability from PCT Application Serial No. PCT/US2016/052935 dated Dec. 19,2017 (33 pages).

International Search Report and Written Opinion—PCT/US2016/052935—ISA/EPO—Mar. 14, 2017.

International Search Report and Written Opinion—PCT/US2016/052926—ISA/EPO—Jan. 5, 2017.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.261, Line Transmission of Non-Telephone Signals, Video Codec for Audiovisual Services At p x 64 kbits, The International Telecommunication Union, Mar. 1990, 32 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.

ITU-T H.263, "Video Coding for Low Bit Rate Communication", Series H: Audiovisual and Multimedia Systems, Infrastructure of audiovisual services—Coding of moving video, Jan. 2005, 226 pages.

ITU-T H.264, Series H: Audiovisual and Multimedia Systems, Infrastructure of audiovisual services—Coding of moving video, Advanced video coding for generic audiovisual services, Mar. 2005, 343 pp.

ITU-T H.265, Series H: Audiovisual and Multimedia Systems, Infrastructure of Audiovisual Services—Coding of Moving Video, High Efficiency Video Coding, The International Telecommunication Union, Apr. 2013, 317 Pages.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Jain A.K., "A sinusoidal family of unitary transforms", IEEE Transactions on Pattern Analysis and Machine Intelligence, Oct. 1, 1979, pp. 356-365, IEEE Service Center, XP011242370, ISSN: 0162-8828.

Jung J., et al., "Non-CE6: Simplified LFNST Signalling", Joint Video Experts Team (JVET) of ITU-T SG 16 WP 3 and ISO/IEC JTC 1/SC 291WG 11, JVET-O0472-v5, 15th Meeting: Gothenburg, SE, Jul. 3-12, 2019, 5 pages.

Karczewicz M., et al., "Study of Coding Efficiency Improvements beyond HEVC," 113. MPEG Meeting; Oct. 19, 2015-Oct. 23, 2015; Geneva; (Motion Picture Expert Group or ISO/IEC JTC1/SC29/WG11),, No. M37102, Oct. 15, 2015 (Oct. 15, 2015), XP030065470, whole document.

Koo M., et al., "CE6: Reduced Secondary Transform (RST) (CE6-3.1)", Joint Video Experts Team (JVET) of ITU-T SG 16 WP 3 and ISO/IEC JTC 1/SC 29/WG 11, JVET-N0193, 14th Meeting: Geneva, CH, Mar. 19-27, 2019, 19 pages.

Lim S-C., et al., "Rate-Distortion Optimized Adaptive Transform Coding," Optical Engineering, Aug. 2009, vol. 48, No. 8, pp. 087004-1-087004-14, 14 Pages.

Marpe D., et al., "Transform Coding Using the Residual Quadtree (RQT)", Fraunhofer Heinrich Hertz Institute, 4pp. URL: http://www.hhi.fraunhofer.de/fields-of-competence/image-processing/researchgroups/ image-video-coding/hevc-high-efficiency-video-coding/transform-coding-using-the-residual-quadtree-rqt.html ; [ Retrieved on Feb. 9, 2017].

(56) References Cited

OTHER PUBLICATIONS

Martucci S.A., et al., "Symmetric convolution and the discrete sine and cosine transforms," IEEE Transactions on Signal Processing, vol. 42, No. 5, May 1, 1994, pp. 1038-1051, IEEE Signal Processing Society, XP000863873.

McCann K., et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Partial International Search Report—PCT/US2016/052935—ISA/EPO—Jan. 13, 2017.

Qualcomm: "Mode-Dependent Non-Separable Secondary Transform", ITU-T SG16 Meeting, Dec. 10, 2015-Oct. 23, 2015, Geneva, No. T13-SG16-C-1 044, Sep. 30, 2015 (Sep. 30, 2015), XP030100752.

Said A., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-L1026-v3, 12th Meeting: Macao, CN, Oct. 3-12, 2018, 14 pages.

Saxena A., et al., "DCT/DST-Based Transform Coding for Intra Prediction in Image/Video Coding," IEEE Transactions on Image Processing, Oct. 2013, vol. 22, Issue 10, pp. 3974-3981.

Second Written Opinion dated from International Application No. PCT/US2016/052926, dated Aug. 29, 2017, 6 pp.

Second Written Opinion from International Application No. PCT/US2016/052935, dated Sep. 28, 2017, 10 pp.

Siekmann M., et al., "CE6-2.1: Simplification of Low Frequency Non-Separable Transform", Joint Video Experts Team (JVET) of ITU-T SG 16 WP 3 and ISO/IEC JTC 1/SC 29/WG 11, JVET-O0094-r1, 15th Meeting: Gothenburg, SE, Jul. 3-12, 2019, 8 pages.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191.

Tech G, et al., "MV-HEVC Draft Text 8", 8. JCT-3V Meeting, Mar. 29, 2014-Apr. 4, 2014, Valencia, (The Joint Collaborative Team on 3d Video Coding Extension Development of ISO/IEC JTC1/SC29/WG11 and ITU-T SG.16 ), URL: http://phenix.int-evry.fr/jct3v/, JCT3V-H1002-v5, Jun. 3, 2014, XP030132292, 163 pages.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Ye Y., et al., "Improved H.264 Intra Coding Based on Bi-Directional Intra Prediction, Directional Transform, and Adaptive Coefficient Scanning", 15th IEEE International Conference on Image Processing, 2008. ICIP 2008, Oct. 2008, pp. 2116-2119.

Yeo C., et al., "Mode-Dependent Transforms for Coding Directional Intra Prediction Residuals," IEEE Transactions on Circuits and Systems for Video Technology, Apr. 2012, vol. 22, No. 4, pp. 545-554.

Zhao X., EE1: Improvements on non-separable secondary transform, Joint Video Exploration Team (JVET) of ITU-T SG16 WP3 and ISO/IEC JTC1/SC29/WG11 4th Meeting: Chengdu, CN, JVET-D0120, Oct. 15-21, 2016, 5 pp.

Zhao X., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-M1026-v4, 13th Meeting: Marrakech, MA, Jan. 9-18, 2019, 9 pages.

Zhao X., et al., "EE2.7 related: Improved non-separable Secondary Transform," 3, JVET Meeting; May 26, 2016-Jan. 6, 2016; Geneva; (The Joint Video Exploration Team of ISO/IEC JTC1/SC29/WG11 and ITU-T SG.16 ); URL: http://phenix.int-evry.frovet/,, No. JVET-00063 XP030150165, 3 pages.

Zhao X., et al., "EE2.7: TU-level non-separable Secondary Transform," 3, JVET Meeting; May 26, 2016-Jan. 6, 2016; Geneva; (The Joint Video Exploration Team of ISO/IEC JTC1/SC29/WG11 and ITU-T SG.16 ); URL: http://phenix.int-evry.fr/jvet/,, No. JVET-00053 XP030150151, 10 pages.

Zhao X., et al., "Video Coding with Rate-Distortion Optimizer Transform," IEEE Transactions on Circuits and Systems for Video Technology, vol. 22, No. 1, Jan. 2012, pp. 138-151.

Zhao X., et al., "TU-level non-separable Secondary Transform," 2, JVET Meeting; Feb. 20, 2016-Feb. 26, 2016; San Diego; (The Joint Video Exploration Team of ISO/IEC JTC1/SC29/WG11 and ITU-T SG.16 ); URL: http://phenix.int-evry.fr/jvet/,, No. JVET-B0059 Feb. 17, 2016 (Feb. 17, 2016), XP030150066, 5 pages.

Zou F., et al., "Rate-Distortion Optimized Transforms Based on the Lloyd-Type Algorithm for Intra Block Coding," IEEE Journal of Selected Topics in Signal Processing, Dec. 2013, vol. 7, Issue 6, pp. 1072-1083.

Response to Written Opinion dated Jan. 5, 2017, from International Application No. PCT/US2016/052926, filed on Jul. 28, 2017, 26 pages.

Response to Written Opinion dated Mar. 14, 2017, from International Application No. PCT/US2016/052935, filed on Jul. 24, 2017, 39 pp.

Saxena A. et al., "On Secondary Transforms for Intra/inter Prediction Residual", 9th Meeting: Geneva, CH, Apr. 27-May 7, 2012, [JCTVC-I0232], Apr. 28, 2012, JCTVC-I0232 (version 3), 100. MPEG Meeting; Apr. 30, 2012-Apr. 5, 2012; Geneva; (Motion Picture Expert Group or ISO/IEC JTC1/SC29/WG11), No. m24474, Apr. 28, 2012 (Apr. 28, 2012), XP030052817, pp. 1-15.

\* cited by examiner

| luma intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| transform set index | 0 | 0 | 1 | 2 | 1 | 2 | 1 | 2 | 3 | 4 | 3 | 4 | 3 | 4 | 5 | 5 | 5 | 6 | 6 | 6 | 7 | 7 | 7 | 8 | 9 | 8 | 9 | 8 | 9 | 10 | 11 | 10 | 11 | 10 |
| luma intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | |
| transform set index | 11 | 10 | 11 | 10 | 11 | 10 | 9 | 8 | 9 | 8 | 9 | 8 | 7 | 7 | 7 | 6 | 6 | 6 | 5 | 5 | 5 | 4 | 3 | 4 | 3 | 4 | 3 | 2 | 1 | 2 | 1 | 2 | 1 | |

FIG. 7A

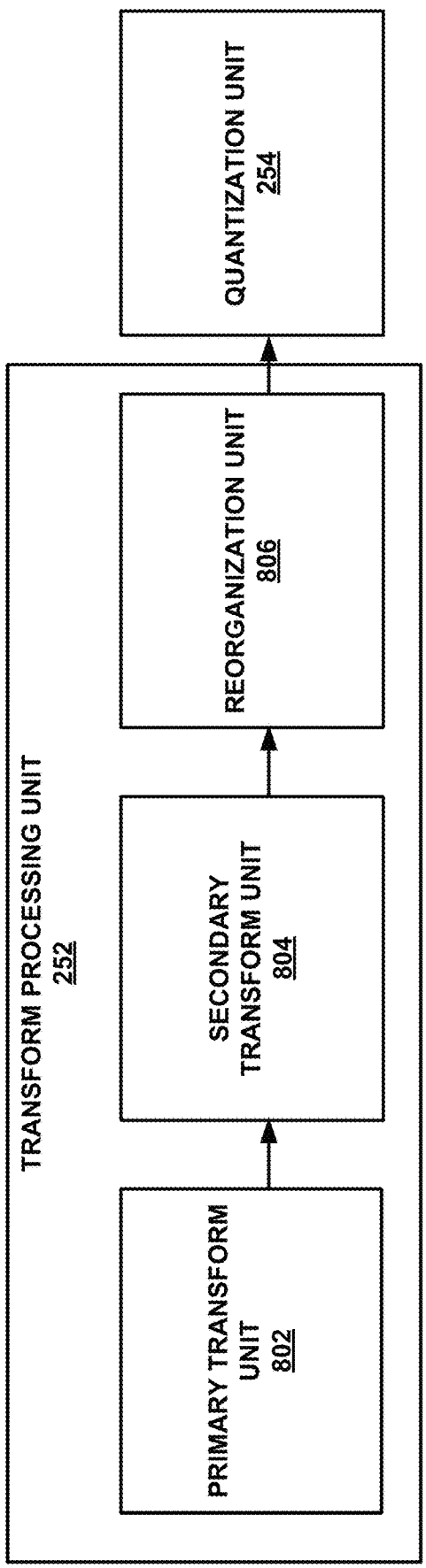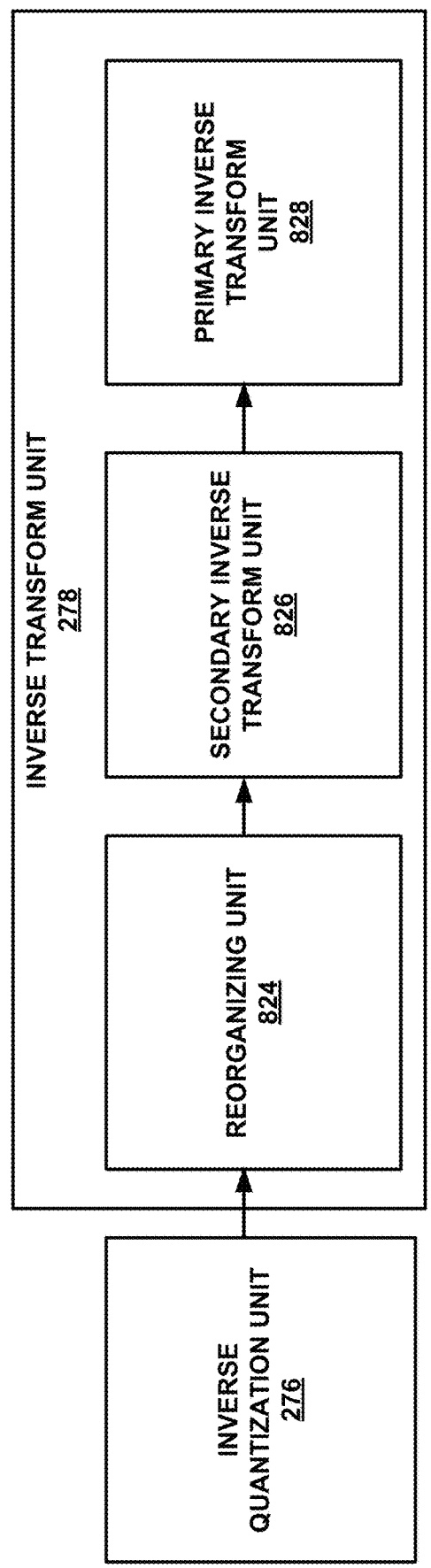
FIG. 10A
FIG. 10B

NON-SEPARABLE SECONDARY TRANSFORM FOR VIDEO CODING

RELATED APPLICATIONS

This application is a continuation of U.S. application Ser. No. 15/270,455, filed Sep. 20, 2016 which claims the benefit of U.S. Provisional Application No. 62/234,644, filed Sep. 29, 2015, U.S. Provisional Application No. 62/294,897, filed Feb. 12, 2016, U.S. Provisional Application No. 62/323,496, filed Apr. 15, 2016, and U.S. Provisional Application No. 62/337,736, filed May 17, 2016, the entirety of each of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in various standards including defined by ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264/MPEG-4, Part 10, Advanced Video Coding (AVC), and ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to secondary transform designs applied for intra or inter prediction residual data in video coding. The transform may be used in the context of advanced video codecs, such as extensions of HEVC or the next generation of video coding standards.

In one example, the disclosure describes a method comprising: inverse quantizing a first coefficient block; applying a first inverse transform to at least part of the inverse quantized first coefficient block to generate a second coefficient block, the first inverse transform being a non-separable transform; applying a second inverse transform to the second coefficient block to generate a residual video block, the second inverse transform converting the second coefficient block from a frequency domain to a pixel domain; and forming a decoded video block, wherein forming the decoded video block comprises summing the residual video block with one or more predictive blocks.

In one example, the disclosure describes a method comprising: forming a residual video block, wherein forming the residual video block comprises subtracting one or more predictive blocks from a video block being coded; applying a first transform to the residual video block to generate a first coefficient block, the first transform converting the residual video block from a pixel domain to a frequency domain; applying a second transform to at least part of the first coefficient block to generate a second coefficient block, the second transform being a non-separable transform; and quantizing the second coefficient block.

In one example, the disclosure describes an apparatus for decoding video data comprising: a memory configured to store the video data; and a video decoder configured to: inverse quantize a first coefficient block; apply a first inverse transform to at least part of the inverse quantized first coefficient block to generate a second coefficient block, the first inverse transform being a non-separable transform; apply a second inverse transform to the second coefficient block to generate a residual video block, the second inverse transform converting the second coefficient block from a frequency domain to a pixel domain; sum the residual video block with one or more predictive blocks; and form a decoded video block based on the sum of the residual video block with one or more predictive blocks.

In one example, the disclosure describes an apparatus for encoding video data comprising: a memory configured to store the video data; and a video encoder configured to: form a residual video block, wherein forming the residual video block comprises subtracting one or more predictive blocks from a video block being coded; apply a first transform to the residual video block to generate a first coefficient block, the first transform converting the residual video block from a pixel domain to a frequency domain; apply a second transform to at least part of the first coefficient block to generate a second coefficient block, the second transform being a non-separable transform; and quantize the second coefficient block.

In one example, the disclosure describes an apparatus for decoding video data comprising: means for inverse quantizing a first coefficient block; means for applying a first inverse transform to at least part of the inverse quantized first coefficient block to generate a second coefficient block, the first inverse transform being a non-separable transform; means for applying a second inverse transform to the second coefficient block to generate a residual video block, the second inverse transform converting the second coefficient block from a frequency domain to a pixel domain; and means for forming a decoded video block, wherein the means for forming the decoded video block comprises means for summing the residual video block with one or more predictive blocks.

In one example, the disclosure describes an apparatus for encoding video data comprising: means for forming a residual video block, wherein forming the residual video block comprises subtracting one or more predictive blocks from a video block being coded; means for, applying a first transform to the residual video block to generate a first coefficient block, the first transform converting the residual video block from a pixel domain to a frequency domain; means for applying a second transform to at least part of the first coefficient block to generate a second coefficient block, the second transform being a non-separable transform; and means for quantizing the second coefficient block.

In one example, the disclosure describes a non-transitory computer-readable storage medium storing instructions that, when executed, cause one or more processors of a device for decoding video data to: inverse quantize a first coefficient block; apply a first inverse transform to at least part of the inverse quantized first coefficient block to generate a second coefficient block, the first inverse transform being a non-separable transform; apply a second inverse transform to the second coefficient block to generate a residual video block, the second inverse transform converting the second coefficient block from a frequency domain to a pixel domain; sum the residual video block with one or more predictive blocks; and form a decoded video block based on the sum of the residual video block with one or more predictive blocks.

In one example, the disclosure describes a non-transitory computer-readable storage medium storing instructions that, when executed, cause one or more processors of a device for encoding video data to: form a residual video block, wherein forming the residual video block comprises subtracting one or more predictive blocks from a video block being coded; apply a first transform to the residual video block to generate a first coefficient block, the first transform converting the residual video block from a pixel domain to a frequency domain; apply a second transform to at least part of the first coefficient block to generate a second coefficient block, the second transform being a non-separable transform; and quantize the second coefficient block.

In one example, the disclosure describes a method for decoding video data, the method comprising: reorganizing a first 2-dimensional coefficient block as a first 1-dimensional coefficient vector according to a coefficient scanning order; applying a first inverse transform to the first 1-dimensional coefficient vector to generate a second 1-dimensional coefficient vector, the first inverse transform being a non-separable transform; reorganizing the first 1-dimensional coefficient vector as a second 2-dimensional coefficient block; applying a second inverse transform to the second 2-dimensional coefficient block to generate a residual video block, the second inverse transform converting the second 2-dimensional coefficient block from a frequency domain to a pixel domain; and forming a decoded video block, wherein forming the decoded video block comprises summing the residual video block with one or more predictive blocks.

In one example, the disclosure describes a method for encoding video data, the method comprising: forming a residual video block, wherein forming the residual video block comprises subtracting one or more predictive blocks from a video block being coded; applying a first transform to at least part of the residual video block to generate a first 2-dimensional coefficient block, the first transform converting the residual video block from a pixel domain to a frequency domain; reorganizing the first 2-dimensional coefficient block as a first 1-dimensional coefficient vector; applying a second transform to at least part of the first 1-dimensional coefficient vector to generate a second 1-dimensional coefficient vector, the second transform being a non-separable transform; and reorganizing the second 1-dimensional coefficient vector as a second 2-dimensional coefficient block according to a coefficient scanning order.

In one example, the disclosure describes an apparatus for decoding video data comprising: a memory configured to store the video data; and a video decoder configured to: reorganize a first 2-dimensional coefficient block as a first 1-dimensional coefficient vector according to a coefficient scanning order; apply a first inverse transform to the first 1-dimensional coefficient vector to generate a second 1-dimensional coefficient vector, the first inverse transform being a non-separable transform; reorganize the first 1-dimensional coefficient vector as a second 2-dimensional coefficient block; apply a second inverse transform to the second 2-dimensional coefficient block to generate a residual video block, the second inverse transform converting the second 2-dimensional coefficient block from a frequency domain to a pixel domain; sum the residual video block with one or more predictive blocks; sum the residual video block with one or more predictive blocks; and form a decoded video block based on the sum of the residual video block with one or more predictive blocks.

In one example, the disclosure describes an apparatus for encoding video data comprising: a memory configured to store the video data; and a video encoder configured to: form a residual video block, wherein forming the residual video block comprises subtracting one or more predictive blocks from a video block being coded; apply a first transform to at least part of the residual video block to generate a first 2-dimensional coefficient block, the first transform converting the residual video block from a pixel domain to a frequency domain; reorganize the first 2-dimensional coefficient block to generate a first 1-dimensional coefficient vector; apply a second transform to at least part of the first 1-dimensional coefficient vector to generate a second 1-dimensional coefficient vector, the second transform being a non-separable transform; and reorganize the second 1-dimensional coefficient vector as a second 2 dimensional coefficient block according to a coefficient scanning order.

In one example, the disclosure describes an apparatus for decoding video data comprising: means for reorganizing a first 2-dimensional coefficient block as a first 1-dimensional coefficient vector according to a coefficient scanning order; means for applying a first inverse transform to the first 1-dimensional coefficient vector to generate a second 1-dimensional coefficient vector, the first inverse transform being a non-separable transform; means for reorganizing the first 1-dimensional coefficient vector as a second 2-dimensional coefficient block; means for applying a second inverse transform to the second 2-dimensional coefficient block to generate a residual video block, the second inverse transform converting the second 2-dimensional coefficient block from a frequency domain to a pixel domain; and means for forming a decoded video block, wherein the means for forming the decoded video block comprises means for summing the residual video block with one or more predictive blocks.

In one example, the disclosure describes an apparatus for encoding video data comprising: means for forming a residual video block, wherein the means for forming the residual video block comprises means for subtracting one or more predictive blocks from a video block being coded; means for applying a first transform to at least part of the residual video block to generate a first 2-dimensional coefficient block, the first transform converting the residual video block from a pixel domain to a frequency domain; means for reorganizing the first 2-dimensional coefficient block to generate a first 1-dimensional coefficient vector; means for applying a second transform to at least part of the first 1-dimensional coefficient vector to generate a second 1-dimensional coefficient vector, the second transform being a non-separable transform; and means for reorganizing the second 1-dimensional coefficient vector as a second 2-dimensional coefficient block according to a coefficient scanning order.

In one example, the disclosure describes a non-transitory computer-readable storage medium storing instructions that, when executed, cause one or more processors of a device for decoding video data to: reorganize a first 2-dimensional coefficient block as a first 1-dimensional coefficient vector according to a coefficient scanning order; apply a first inverse transform to the first 1-dimensional coefficient vector to generate a second 1-dimensional coefficient vector, the first inverse transform being a non-separable transform; reorganize the first 1-dimensional coefficient vector as a second 2-dimensional coefficient block; apply a second inverse transform to the second 2-dimensional coefficient block to generate a residual video block, the second inverse transform converting the second 2-dimensional coefficient block from a frequency domain to a pixel domain; and form a decoded video block, wherein forming the decoded video block comprises summing the residual video block with one or more predictive blocks.

In one example, the disclosure describes a non-transitory computer-readable storage medium storing instructions that, when executed, cause one or more processors of a device for encoding video data to: form a residual video block, comprising subtracting one or more predictive blocks from a video block being coded; apply a first transform to at least part of the residual video block to generate a first 2-dimensional coefficient block, the first transform converting the residual video block from a pixel domain to a frequency domain; reorganize the first 2-dimensional coefficient block to generate a first 1-dimensional coefficient vector; apply a second transform to at least part of the first 1-dimensional coefficient vector to generate a second 1-dimensional coefficient vector, the second transform being a non-separable transform; and reorganize the second 1-dimensional coefficient vector as a second 2 dimensional coefficient block according to a coefficient scanning order.

The details of one or more examples are set forth in the accompanying drawings and the description below. Other features, objects, and advantages will be apparent from the description, drawings, and claims.

BRIEF DESCRIPTION OF DRAWINGS

FIG. 7A is an illustration of an example mapping from luma intra mode to transform set index.

FIG. 10A is an illustration of an example transform processing by a video encoder, in accordance with one or more techniques described in this disclosure.

FIG. 10B is an illustration of an example inverse transform processing by a video decoder, in accordance with one or more techniques described in this disclosure.

DETAILED DESCRIPTION

Figure 1:
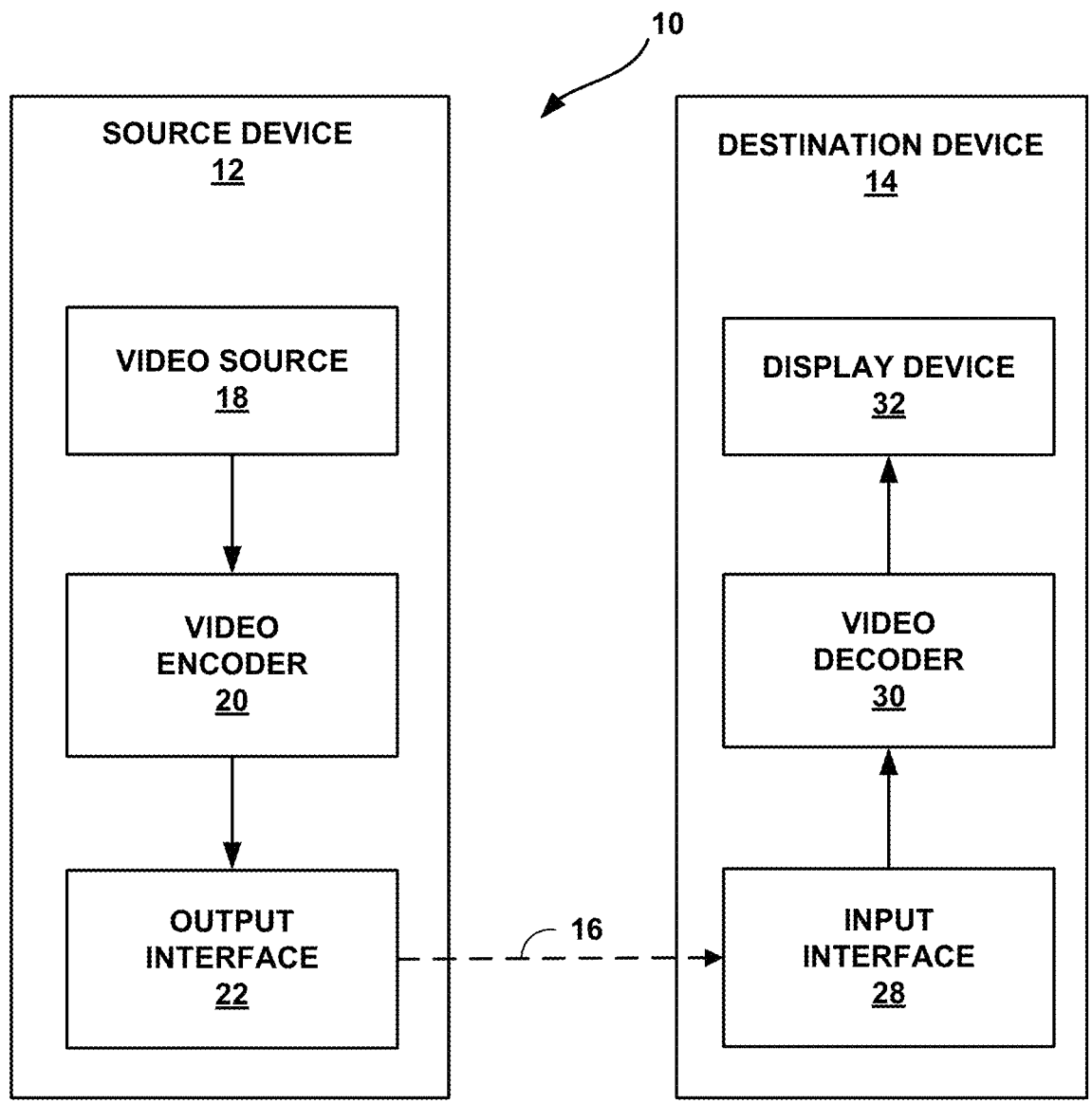
FIG. 1 is a block diagram illustrating an example video encoding and decoding system that may utilize techniques described in this disclosure.

In general, this disclosure describes techniques related to secondary transform designs applied for intra or inter prediction residual data in video coding. The transform may be used in the context of advanced video codecs, such as extensions of HEVC or the next generation of video coding standards.

A video encoder may represent residual blocks for video data in a form suitable for output from the video encoder to a video decoder. It is desirable to reduce an amount of data used to represent the residual blocks such that an amount of data transmitted from the video encoder to the video decoder is reduced. In video coding, separable transforms have been applied over non-separable transforms because separable transforms may use fewer operations (e.g., addition, multiplication), as compared to a non-separable transform. Separable transforms are filters that can be written as a product of two or more filters. In contrast, a non-separable filter cannot be written as a product of two or more filters.

Rather than relying solely on a transform that converts a residual block in a pixel domain to a coefficient block in a frequency domain, a video encoder may also apply a secondary transform to increase energy compaction of the coefficient block. For instance, the secondary transform may concentrate non-zero coefficients of the coefficient block closer to the DC coefficient of the coefficient block. As a result, there may be fewer coefficients between the DC coefficient of the coefficient block and the last significant (i.e., non-zero) coefficient of the coefficient block, resulting in a reduced amount of data used to represent the residual block. Similarly, a video decoder may apply an inverse primary transform to transform the coefficient block into a residual block. In this manner, data used to represent residual blocks may be reduced, thereby reducing bandwidth and/or storage requirements for the video data, and potentially reducing energy usage of the video decoder and video encoder.

Existing designs of the secondary transform apply the secondary transform as a separable transform. In some instances, separable transforms have been applied instead of non-separable because separable transforms have a lower complexity compared to non-separable transforms. As such, separable transforms may have become favored over non-separable transforms for video coding schemes. However, the use of a non-separable transform as the secondary transform may provide improved transform efficiency. For instance, a device may be able to apply a non-separable secondary transform faster or with less complexity than a separable secondary transform. Thus, in accordance with an example of this disclosure, a video decoder may apply a first inverse transform to at least part of an inverse quantized first coefficient block to generate a second coefficient block, the first inverse transform being a non-separable transform. Additionally, in this example, the video decoder may apply a second inverse transform to the second coefficient block to generate a residual video block. The second inverse transform may convert the second coefficient block from a frequency domain to a pixel domain. In this example, the video decoder may form a decoded video block. In some examples, as part of forming the decoded video block, the video decoder may sum the residual video block with one or more predictive blocks.

Differences in the compression of video data, for example, different intra prediction modes, may change an effectiveness of a non-separable secondary transform. For example, a first non-separable secondary transform may have a higher energy compaction than a second non-separable secondary transform when using a first intra prediction mode. In the example, however, the second non-separable secondary transform may have a higher energy compaction than the first non-separable secondary transform when using a second intra prediction mode. Accordingly, it may be desirable to permit techniques that select a candidate non-separable secondary transform from a set of candidate non-separable secondary transforms. That is, rather than using a same non-separable secondary transform for different video data, a video encoder may select a candidate non-separable secondary transform from a set of non-separable secondary transforms. For instance, the video encoder may formulate a subset of non-separable secondary transforms based on a intra prediction mode. Similarly, in some examples, a video decoder may select a candidate non-separable secondary transform from a set of non-separable secondary transforms. For instance, the video decoder may formulate a subset of non-separable secondary transforms based on already decoded information of the video data. In this manner, a more suitable non-separable secondary transform may be selected to apply to residual blocks, which may result in a reduced amount of data used to represent the residual blocks compared with examples that use only one non-separable secondary transform candidate.

In some examples, rather than necessarily quantizing transform coefficients in a vector format, a video encoder may reorganize the transform coefficients into a two-dimensional coefficient block. More specifically, in some instances, a quantization unit may be configured to quantize a two-dimensional coefficient block, which may be a format that is output by a separable transform. Accordingly, a same quantization unit may be used in instances where a video encoder only uses a separable transform as well as instances where the video encoder used a separable transform and a non-separable transform.

FIG. 1 is a block diagram illustrating an example video encoding and decoding system 10 that may utilize techniques described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In an example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to destination device 14. Example file servers include a web server (e.g., for a website), an FTP server, network attached storage (NAS)

devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques described in this disclosure, such as, for example, techniques relating to secondary transforms. In accordance with this disclosure, video decoder 30 of destination device 14 may be configured to apply the techniques described in this disclosure, such as, for example, techniques relating to secondary transforms. In other examples, a source device and a destination device may include other components or arrangements. For example, source device 12 may receive video data from an external video source 18, such as an external camera. Likewise, destination device 14 may interface with an external display device, rather than including an integrated display device.

As noted above, source device 12 includes output interface 22 and destination device 14 includes input interface 28. In some examples, output interface 22 represents a transmitter and input interface 28 represents a receiver. In other examples, output interface 22 and input interface 28 represent examples of transceivers (that is, interfaces capable of both transmitting and receiving data signals wirelessly). The transceivers may be configured to send and receive video data in wireless signals. For example, output interface 22, when implemented as a transceiver, may send a data signal (e.g., computer-readable medium 16) including encoded video data, while input interface 28, when implemented as a transceiver, may receive a data signal (e.g., computer-readable medium 16) including encoded video data. As discussed above, video encoder 20 may provide the encoded video data to output interface 22, while input interface 28 may provide encoded video data to video decoder 30.

The illustrated system 10 of FIG. 1 is merely one example. Techniques described in this disclosure may be performed by any digital video encoding and/or decoding device. Although generally the techniques of this disclosure are performed by a video encoding device and a video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto computer-readable medium 16.

Computer-readable medium 16 may include transient media, such as a wireless broadcast or wired network transmission. In some examples, a network server (not shown) may receive encoded video data from source device 12 and provide the encoded video data to destination device 14, e.g., via network transmission. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the standards described above and, in some examples, according to the High Efficiency Video Coding (HEVC) standard, also referred to as ITU-T H.265, or extensions of the HEVC standard, or according to the next generation of video coding standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a protocol such as the ITU H.223 multiplexer protocol, or other protocols such as the user datagram protocol (UDP).

The techniques of this disclosure are generally described with respect to ITU-T H.265, also referred to as High Efficiency Video Coding (HEVC), which is described in "SERIES H: AUDIOVISUAL AND MULTIMEDIA SYSTEMS, Infrastructure of audiovisual services-Coding of moving video," *High Efficiency Video Coding*, ITU-T H.265, April 2013. However, these techniques may be applied to other video coding standards, including extensions of HEVC and extensions of other standards. Examples of other video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264/MPEG-4, Part 10, Advanced Video Coding (AVC), including its Scalable Video Coding (SVC) and Multiview Video Coding (MVC) extensions.

The H.265 standard was recently finalized by the Joint Collaboration Team on Video Coding (JCT-VC) of ITU-T Video Coding Experts Group (VCEG) and ISO/IEC Motion Picture Experts Group (MPEG). An HEVC draft specification, referred to as HEVC WD hereinafter, is available from http://phenix.int-evry.fr/jct/doc_end_user/documents/14_Vienna/wg11/JCTVC-N1003-v1.zip.

The multiview extension to HEVC, MV-HEVC, has also been developed by the JCT-3V. An example of a Working Draft (WD) of MV-HEVC, referred to as MV-HEVC WD8, is available from phenix.it-sudparis.eu/jct2/doc_end_user/documents/8_Valencia/wg11/JCT3V-H1002-v5.zip. A scalable extension to HEVC, named SHVC, has also been developed by the JCT-VC. An example of a Working Draft (WD) of SHVC, referred to as SHVC WD6, is available from phenix.it-sudparis.eu/jct/doc_end_user/documents/17_Valencia/wg11/JCTVC-Q1008-v2.zip.

In HEVC and other video codecs, a video frame or picture may be divided into a sequence of treeblocks, which are also known as largest coding units (LCUs), that may include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices.

To generate an encoded CTU (i.e., to encode a CTU) in HEVC, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Each treeblock may be split into CUs according to a quadtree data structure. In general, a quadtree data structure includes one node per CU, with a root node corresponding to the treeblock. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU are also referred to as leaf-CUs even if there is no explicit splitting of the original leaf-CU. For example, if a CU at 16×16 size is not split further, the four 8×8 sub-CUs are also referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). A size of the CU corresponds to a size of the coding node and is generally square in shape. The size of the CU may range from 8×8 pixels up to the size of the treeblock with a maximum size, e.g., 64×64 pixels or greater.

A CU includes a coding node and prediction units (PUs) and transform units (TUs) associated with the coding node. Each CU may contain one or more PUs and one or more TUs. Syntax data associated with a CU may describe, for example, partitioning of the CU into one or more PUs. As part of encoding a CU, video encoder 20 may partition a coding block of the CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Video encoder 20 may use intra prediction or inter prediction to generate the predictive blocks for a PU. Each CU is coded with one of either intra prediction mode or inter prediction mode. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

Partitioning modes may differ between whether the CU is skip or direct mode encoded, intra-prediction mode encoded, or inter-prediction mode encoded. PUs may be partitioned to be non-square in shape.

Furthermore, video encoder 20 may decompose each residual block of a CU into one or more transform blocks. A transform block may be a rectangular (square or non-square) block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block. In some examples, the residual blocks the same CU for luma and chroma components may be partitioned in different ways.

Syntax data associated with a CU may also describe, for example, partitioning of the CU into one or more TUs according to a quadtree. A TU can be square or non-square (e.g., rectangular) in shape. This disclosure may use the term "block" to refer to any of a CU, PU, or TU, in the context of HEVC, or similar data structures in the context of other standards (e.g., macroblocks and sub-blocks thereof in H.264/AVC).

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more PUs. In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a RQT, which may include data describing an intra-prediction mode for a TU corresponding to the PU. The RQT may also be referred to as a transform tree. In some examples, the intra-prediction mode may be signaled in the leaf-CU syntax, instead of the RQT. As an example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more TUs. The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be greater or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as RQTs or transform trees as noted above. That is, a leaf-CU may include a quadtree indicating how the leaf-CU is partitioned into TUs. The root node of a TU quadtree generally corresponds to a leaf-CU, while the root node of a CU quadtree generally corresponds to a treeblock. TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a technique or mode of generating predictive pixel data in the spatial domain (also referred to as the pixel domain) and the TUs may comprise coefficients in the transform domain following application of a transform, e.g., a Discrete Cosine Transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following application of any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scanning order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode particular syntax elements representing transform coefficients in the one-dimensional vector, e.g., according to context-adaptive variable length coding (CAVLC), context-adaptive binary arithmetic coding (CABAC), syntax-based context-adaptive binary arithmetic coding (SBAC), probability interval partitioning entropy (PIPE) coding or another entropy encoding methodology. Video encoder 20 may also entropy encode syntax elements associated with the encoded video data for use by video decoder 30 in decoding the video data.

In general, video decoder 30 performs a similar, albeit reciprocal, process to that performed by video encoder 20 to decode encoded data. For example, video decoder 30 inverse quantizes and inverse transforms transform coefficients of a received TU to reproduce a residual block. Video decoder 30 may use a signaled prediction mode (intra- or inter-prediction) to form a predicted block. Video decoder 30 may combine the predicted block and the residual block (on a pixel-by-pixel basis) to reproduce the original block. Video decoder 30 may perform additional processing, such as performing a deblocking process, to reduce visual artifacts along block boundaries.

Furthermore, video decoder 30 may decode syntax elements using CABAC in a manner substantially similar to, albeit reciprocal to, the CABAC encoding process of video encoder 20.

As previously noted, video encoder 20 may apply a DCT, an integer transform, a wavelet transform, or a conceptually similar transform to residual video data. Such separable transforms may indicate the process of deriving an alternative representation of the input signal. Given an N-point vector $x=[x_0, x_1, \ldots, x_{N-1}]^T$ and a set of given vectors $\{\Phi_0, \Phi_1, \ldots, \Phi_{M-1}\}$, x can be approximated or exactly represented using a linear combination of $\Phi_0, \Phi_1, \ldots, \Phi_{M-1}$, which can be formulated as follows, $$\hat{x} = \sum_{i=0}^{M-1} f_i \cdot \Phi_i$$

where $\hat{x}$ can be an approximation or equivalent of x, vector $f=[f_1, f_2, \ldots, f_{M-1}]$ is called the transform coefficient vector and $\{\Phi_0, \Phi_1, \ldots, \Phi_{M-1}\}$ are the transform basis vectors.

In the scenario of video coding, transform coefficients may be roughly non-correlated and sparse. For example, the energy of the input vector x may be compacted only on a few transform coefficients, and the remaining majority transform coefficients are typically close to zero.

Given the specific input data, the optimal transform in terms of energy compaction may be the so-called Karhunen-Loeve transform (KLT). The KLT uses the eigenvectors of the covariance matrix of the input data as transform basis vectors. Therefore, KLT is actually a data-dependent transform and does not have a general mathematical formulation. However, under certain assumptions, such as the input data forming a first-order stationary Markov process, it has been proven in the literature that the corresponding KLT is actually a member of the sinusoidal family of unitary transforms, which are described in Jain, A. K., A sinusoidal family of unitary transforms, IEEE Trans. on Pattern Analysis and Machine Intelligence, 1, 356, 1979. The sinusoidal family of unitary transforms may indicate transforms using transform basis vectors formulated as follows:

$$\Phi_m(k) = A \cdot e^{ike} + B \cdot e^{-ike}$$

In the equation above, e is the base of the natural logarithm approximately equal to 2.71828, A, B, and θ are complex in general, and depend on the value of m. Additionally, in the equation above, $\Phi_m$ is a vector, $\Phi_m(k)$ indicates the kth component of vector $\Phi_m$, and i indicates the imaginary part of a complex number.

Several well-known transforms, including the discrete Fourier transform, cosine transform, sine transform, and the KLT (for first-order stationary Markov processes), are members of this sinusoidal family of unitary transforms. As described in S. A. Martucci, "Symmetric convolution and the discrete sine and cosine transforms," IEEE Trans. Sig. Processing SP-42, 1038-1051 (1994), the complete DCT and Discrete Sine Transform (DST) families may include a total of 16 transforms based on different types and a complete definition of the different types of DCT and DST are given below. The different types may correspond to different values of A, B, and θ.

Assume an input N-point vector is denoted as $x=[x_0, x_1, \ldots, x_{N-1}]^T$, and the N-point vector is transformed to another N-point transform coefficient vector denoted as $y=[y_0, y_1, \ldots, y_{N-1}]^T$ by multiplying a matrix. The process transforming x to y can be further illustrated according to one of the following transform formulations, wherein k ranges from 0 through N−1, inclusive:

DCT Type-I (DCT-1):

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$

$$\text{where } w_0 = \begin{cases} \frac{1}{\sqrt{2}}, & \text{if } n = 0 \text{ or } n = N-1 \\ 1, & \text{otherwise} \end{cases},$$

$$w_1 = \begin{cases} \frac{1}{\sqrt{2}}, & \text{if } k = 0 \text{ or } k = N-1 \\ 1, & \text{otherwise} \end{cases}$$

-continued

DCT Type-II (DCT-2):

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$

where $w_0 = \begin{cases} \frac{1}{\sqrt{2}}, & \text{if } k = 0 \\ 1, & \text{otherwise} \end{cases}$ DCT Type-III (DCT-3):

$$y_k = \sum_{n=0}^{N-1} \sqrt{\frac{2}{N}} \cos\left(\frac{\pi \cdot n \cdot (k+0.5)}{N}\right) \cdot w_0 \cdot x_n,$$

where $w_0 = \begin{cases} \frac{1}{\sqrt{2}}, & \text{if } n = 0 \\ 1, & \text{otherwise} \end{cases}$ DCT Type-IV (DCT-4):

$$y_k = \sum_{n=0}^{N-1} \sqrt{\frac{2}{N}} \cos\left(\frac{\pi \cdot (n+0.5) \cdot (k+0.5)}{N}\right) \cdot x_n,$$

DCT Type-V (DCT-5):

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otherwise} \end{cases}$, $w_1 = \begin{cases} \frac{1}{\sqrt{2}}, & \text{if } k = 0 \\ 1, & \text{otherwise} \end{cases}$ DCT Type-VI (DCT-6):

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otherwise} \end{cases}$, $w_1 = \begin{cases} \frac{1}{\sqrt{2}}, & \text{if } k = 0 \\ 1, & \text{otherwise} \end{cases}$ DCT Type-VII (DCT-7):

$$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otherwise} \end{cases}$, $w_1 = \begin{cases} \frac{1}{\sqrt{2}}, & \text{if } k = N-1 \\ 1, & \text{otherwise} \end{cases}$ DCT Type-VIII (DCT-8):

$$y_k = \sum_{n=0}^{N-1} \sqrt{\frac{2}{N-0.5}} \cos\left(\frac{\pi \cdot (n+0.5) \cdot (k+0.5)}{N-0.5}\right) \cdot x_n,$$

DST Type-I (DST-1):

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

DST Type-II (DST-2):

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $w_0 = \begin{cases} \frac{1}{\sqrt{2}}, & \text{if } k = N-1 \\ 1, & \text{otherwise} \end{cases}$ DST Type-III (DST-3):

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $w_0 = \begin{cases} \frac{1}{\sqrt{2}}, & \text{if } n = N-1 \\ 1, & \text{otherwise} \end{cases}$ DST Type-IV (DST-4):

$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

DST Type-V (DST-5):

$$y_k = \sum_{n=0}^{N-1} \sqrt{\frac{2}{N+0.5}} \sin\left(\frac{\pi \cdot (n+1) \cdot (k-1)}{N+0.5}\right) \cdot x_n,$$

DST Type-VI (DST-6):

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7):

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8):

$$y_k = \sum_{n=0}^{N-1} \sqrt{\frac{2}{N-0.5}} \cos\left(\frac{\pi \cdot (n+0.5) \cdot (k+0.5)}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otherwise} \end{cases}$, $w_1 = \begin{cases} \frac{1}{\sqrt{2}}, & \text{if } k = N-1 \\ 1, & \text{otherwise} \end{cases}$ A transform type, such as a DST type, may be specified by a mathematical formulation of a transform basis function. For example, 4-point DST-VII and 8-point DST-VII have the same transform type, regardless the value of N.

Without loss of generality, all the above transform types may be represented using the generalized formulation below:

$$y_m = \sum_{n=0}^{N-1} T_{m,n} \cdot x_n.$$

In the equation above, T is the transform matrix that may be specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots, T_{i,N-1}]$ are the ith transform basis vectors. A transform applied on the N-point input vector may be called an N-point transform.

It is also noted that the above transform formulations, which are applied on the 1-D input data x, can be represented in matrix multiplication form as below:

$$y = Tx$$

In the equation above, T indicates the transform matrix, x indicates the input data vector, and y indicates the output transform coefficients vector.

The transforms introduced in the previous section may be applied on 1-D input data, and transforms can be also extended for 2-D input data sources. In the following discussion, X is an input M×N data array. The techniques of applying transform on 2-D input data may include separable and non-separable 2-D transforms.

A separable 2-D transform applies 1-D transforms for horizontal and vertical vectors of X sequentially, formulated as below:

$$Y = C \cdot X \cdot R^T$$

In the equation above, C and R denote the given M×M and N×N transform matrices, respectively. From the formulation, it can be seen that C applies 1-D transforms for the column vectors of X, while R applies 1-D transforms for row vectors of X. In the later part of this document, for simplicity, C and R are denoted as left (vertical) and right (horizontal) transforms and they both form a transform pair. There are cases when C is equal to R and is an orthogonal matrix. In such a case, the separable 2-D transform may be determined by just one transform matrix.

In some examples, a non-separable 2-D transform may first reorganize all elements of X into a single vector, namely X', by applying the following mathematical mapping:

$$X'_{(i \cdot N + j)} = X_{i,j}$$

Then, a 1-D transform T' may be applied for X' as below:

$$Y = T' \cdot X'$$

In the equation above, T' is an (M*N)×(M*N) transform matrix.

In video coding, separable 2-D transforms may be applied because 2-D transforms may use fewer operation counts (e.g., addition, multiplication) as compared to a 1-D transform.

In conventional video codecs, such as H.264/AVC, an integer approximation of the 4-point and 8-point DCT Type-II is applied for both intra and inter prediction residual. In other words, a video coder may apply an integer approximation of the 4-point and 8-point DCT Type-II to residual blocks generated using intra or inter prediction. To better accommodate various statistics of residual samples, more flexible types of transforms other than DCT Type-II is utilized in the new generation video codec. For example, in HEVC, an integer approximation of the 4-point Type-VII DST may be utilized for intra prediction residual. As described in J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729, it has been both theoretically proven and experimentally validated that the DST Type-VII used in HEVC is more efficient than DCT Type-II for residuals vectors generated along intra prediction directions. For instance, DST Type-VII is more efficient than DCT Type-II for row residual vectors generated by the horizontal intra prediction direction. In HEVC, an integer approximation of 4-point DST Type-VII is applied only for 4×4 luma intra prediction residual blocks. The 4-point DST-VII used in HEVC is shown below:

4×4 DST-VII:
{29, 55, 74, 84}
{74, 74, 0, −74}
{84, −29, −74, 55}
{55, −84, 74, −29}

In HEVC, for residual blocks that are not 4×4 luma intra prediction residual blocks, integer approximations of the 4-point, 8-point, 16-point and 32-point DCT Type-II may also be applied, as shown below:

4-Point DCT-II:
{64, 64, 64, 64}
{83, 36, −36, −83}
{64, −64, −64, 64}
{36, −83, 83, −36}

8-Point DCT-II:
{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}

16-Point DCT-II:
{64, 64, 64, 64, 64, 64, 64, 64, 64, 64, 64, 64, 64, 64, 64, 64}
{90, 87, 80, 70, 57, 43, 25, 9, −9, −25, −43, −57, −70, −80, −87, −90}
{89, 75, 50, 18, −18, −50, −75, −89, −89, −75, −50, −18, 18, 50, 75, 89}
{87, 57, 9, −43, −80, −90, −70, −25, 25, 70, 90, 80, 43, −9, −57, −87}
{83, 36, −36, −83, −83, −36, 36, 83, 83, 36, −36, −83, −83, −36, 36, 83}
{80, 9, −70, −87, −25, 57, 90, 43, −43, −90, −57, 25, 87, 70, −9, −80}
{75, −18, −89, −50, 50, 89, 18, −75, −75, 18, 89, 50, −50, −89, −18, 75}
{70, −43, −87, 9, 90, 25, −80, −57, 57, 80, −25, −90, −9, 87, 43, −70}
{64, −64, −64, 64, 64, −64, −64, 64, 64, −64, −64, 64, 64, −64, −64, 64}
{57, −80, −25, 90, −9, −87, 43, 70, −70, −43, 87, 9, −90, 25, 80, −57}
{50, −89, 18, 75, −75, −18, 89, −50, −50, 89, −18, −75, 75, 18, −89, 50}
{43, −90, 57, 25, −87, 70, 9, −80, 80, −9, −70, 87, −25, −57, 90, −43}
{36, −83, 83, −36, −36, 83, −83, 36, 36, −83, 83, −36, −36, 83, −83, 36}
{25, −70, 90, −80, 43, 9, −57, 87, −87, 57, −9, −43, 80, −90, 70, −25}
{18, −50, 75, −89, 89, −75, 50, −18, −18, 50, −75, 89, −89, 75, −50, 18}

{9, −25, 43, −57, 70, −80, 87, −90, 90, −87, 80, −70, 57, −43, 25, −9}

32-Point-DC-II:

{64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64}

{90, 90, 88, 85, 82, 78, 73, 67, 61, 54, 46, 38, 31, 22, 13, 4, −4, −13, −22, −31, −38, −46, −54, −61, −67, −73, −78, −82, −85, −88, −90, −90}

{90, 87, 80, 70, 57, 43, 25, 9, −9, −25, −43, −57, −70, −80, −87, −90, −90, −87, −80, −70, −57, −43, −25, −9, 9, 25, 43, 57, 70, 80, 87, 90}

{90, 82, 67, 46, 22, −4, −31, −54, −73, −85, −90, −88, −78, −61, −38, −13, 13, 38, 61, 78, 88, 90, 85, 73, 54, 31, 4, −22, −46, −67, −82, −90}

{89, 75, 50, 18, −18, −50, −75, −89, −89, −75, −50, −18, 18, 50, 75, 89, 89, 75, 50, 18, −18, −50, −75, −89, −89, −75, −50, −18, 18, 50, 75, 89}

{88, 67, 31, −13, −54, −82, −90, −78, −46, −4, 38, 73, 90, 85, 61, 22, −22, −61, −85, −90, −73, −38, 4, 46, 78, 90, 82, 54, 13, −31, −67, −88}

{87, 57, 9, −43, −80, −90, −70, −25, 25, 70, 90, 80, 43, −9, −57, −87, −87, −57, −9, 43, 80, 90, 70, 25, −25, −70, −90, −80, −43, 9, 57, 87}

{85, 46, −13, −67, −90, −73, −22, 38, 82, 88, 54, −4, −61, −90, −78, −31, 31, 78, 90, 61, 4, −54, −88, −82, −38, 22, 73, 90, 67, 13, −46, −85}

{83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83}

{82, 22, −54, −90, −61, 13, 78, 85, 31, −46, −90, −67, 4, 73, 88, 38, −38, −88, −73, −4, 67, 90, 46, −31, −85, −78, −13, 61, 90, 54, −22, −82}

{80, 9, −70, −87, −25, 57, 90, 43, −43, −90, −57, 25, 87, 70, −9, −80, −80, −9, 70, 87, 25, −57, −90, −43, 43, 90, 57, −25, −87, −70, 9, 80}

{78, −4, −82, −73, 13, 85, 67, −22, −88, −61, 31, 90, 54, −38, −90, −46, 46, 90, 38, −54, −90, −31, 61, 88, 22, −67, −85, −13, 73, 82, 4, −78}

{75, −18, −89, −50, 50, 89, 18, −75, −75, 18, 89, 50, −50, −89, −18, 75, 75, −18, −89, −50, 50, 89, 18, −75, −75, 18, 89, 50, −50, −89, −18, 75}

{73, −31, −90, −22, 78, 67, −38, −90, −13, 82, 61, −46, −88, −4, 85, 54, −54, −85, 4, 88, 46, −61, −82, 13, 90, 38, −67, −78, 22, 90, 31, −73}

{70, −43, −87, 9, 90, 25, −80, −57, 57, 80, −25, −90, −9, 87, 43, −70, −70, 43, 87, −9, −90, −25, 80, 57, −57, −80, 25, 90, 9, −87, −43, 70}

{67, −54, −78, 38, 85, −22, −90, 4, 90, 13, −88, −31, 82, 46, −73, −61, 61, 73, −46, −82, 31, 88, −13, −90, −4, 90, 22, −85, −38, 78, 54, −67}

{64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64}

{61, −73, −46, 82, 31, −88, −13, 90, −4, −90, 22, 85, −38, −78, 54, 67, −67, −54, 78, 38, −85, −22, 90, 4, −90, 13, 88, −31, −82, 46, 73, −61}

{57, −80, −25, 90, −9, −87, 43, 70, −70, −43, 87, 9, −90, 25, 80, −57, −57, 80, 25, −90, 9, 87, −43, −70, 70, 43, −87, −9, 90, −25, −80, 57}

{54, −85, −4, 88, −46, −61, 82, 13, −90, 38, 67, −78, −22, 90, −31, −73, 73, 31, −90, 22, 78, −67, −38, 90, −13, −82, 61, 46, −88, 4, 85, −54}

{50, −89, 18, 75, −75, −18, 89, −50, −50, 89, −18, −75, 75, 18, −89, 50, 50, −89, 18, 75, −75, −18, 89, −50, −50, 89, −18, −75, 75, 18, −89, 50}

{46, −90, 38, 54, −90, 31, 61, −88, 22, 67, −85, 13, 73, −82, 4, 78, −78, −4, 82, −73, −13, 85, −67, −22, 88, −61, −31, 90, −54, −38, 90, −46}

{43, −90, 57, 25, −87, 70, 9, −80, 80, −9, −70, 87, −25, −57, 90, −43, −43, 90, −57, −25, 87, −70, −9, 80, −80, 9, 70, −87, 25, 57, −90, 43}

{38, −88, 73, −4, −67, 90, −46, −31, 85, −78, 13, 61, −90, 54, 22, −82, 82, −22, −54, 90, −61, −13, 78, −85, 31, 46, −90, 67, 4, −73, 88, −38}

{36, −83, 83, −36, −36, 83, −83, 36, 36, −83, 83, −36, −36, 83, −83, 36, 36, −83, 83, −36, −36, 83, −83, 36, 36, −83, 83, −36, −36, 83, −83, 36}

{31, −78, 90, −61, 4, 54, −88, 82, −38, −22, 73, −90, 67, −13, −46, 85, −85, 46, 13, −67, 90, −73, 22, 38, −82, 88, −54, −4, 61, −90, 78, −31}

{25, −70, 90, −80, 43, 9, −57, 87, −87, 57, −9, −43, 80, −90, 70, −25, −25, 70, −90, 80, −43, −9, 57, −87, 87, −57, 9, 43, −80, 90, −70, 25}

{22, −61, 85, −90, 73, −38, −4, 46, −78, 90, −82, 54, −13, −31, 67, −88, 88, −67, 31, 13, −54, 82, −90, 78, −46, 4, 38, −73, 90, −85, 61, −22}

{18, −50, 75, −89, 89, −75, 50, −18, −18, 50, −75, 89, −89, 75, −50, 18, 18, −50, 75, −89, 89, −75, 50, −18, −18, 50, −75, 89, −89, 75, −50, 18}

{13, −38, 61, −78, 88, −90, 85, −73, 54, −31, 4, 22, −46, 67, −82, 90, −90, 82, −67, 46, −22, −4, 31, −54, 73, −85, 90, −88, 78, −61, 38, −13}

{9, −25, 43, −57, 70, −80, 87, −90, 90, −87, 80, −70, 57, −43, 25, −9, −9, 25, −43, 57, −70, 80, −87, 90, −90, 87, −80, 70, −57, 43, −25, 9}

{4, −13, 22, −31, 38, −46, 54, −61, 67, −73, 78, −82, 85, −88, 90, −90, 90, −90, 88, −85, 82, −78, 73, −67, 61, −54, 46, −38, 31, −22, 13, −4}

As described in http://www.hhi.fraunhofer.de/fields-of-competence/image-processing/research-groups/image-video-coding/hevc-high-efficiency-video-coding/transform-coding-using-the-residual-quadtree-rqt.html, to adapt to various characteristics of residual blocks, a transform coding structure using a residual quadtree (RQT) may be applied in HEVC. As briefly described above, each picture may be divided into coding tree units (CTUs). The CTUs may be coded in raster scanning order for a specific tile or slice. A CTU may be a square block and may represent the root of a quadtree, e.g., a coding tree. The CTU size may range from 8×8 to 64×64 luma samples, but 64×64 is typically used. Each CTU may be further split into smaller square blocks called CUs. After a CTU is split recursively into CUs, each CU may be further divided into one or more PUs and one or more TUs. The partitioning of a CU into TUs may be carried out recursively based on a quadtree approach. Therefore, the residual signal of each CU is coded by a tree structure namely, a residual quadtree (RQT).

Figure 2:
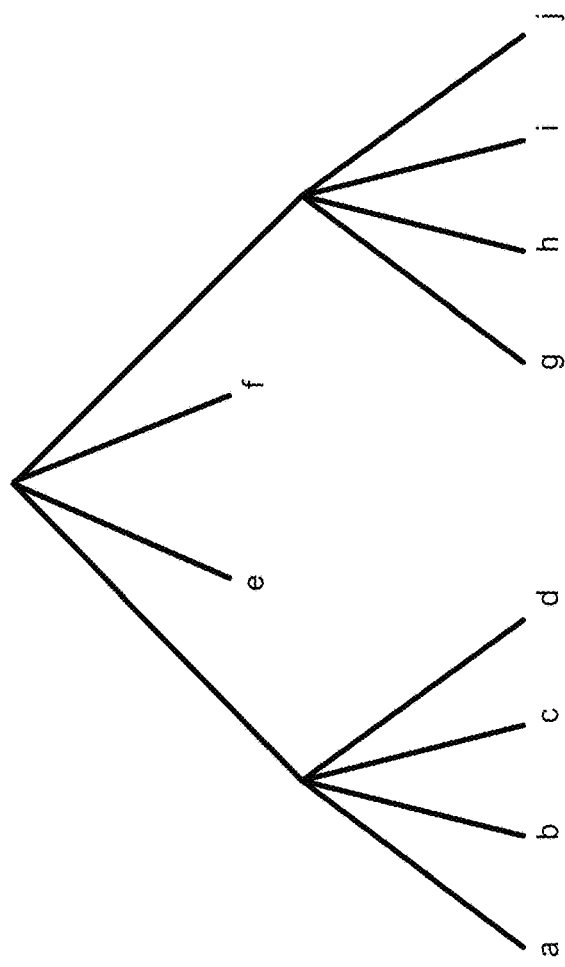
FIG. 2 is an illustration of a transform scheme based on residual quadtree in HEVC that may utilize techniques described in this disclosure.
Figure 2:
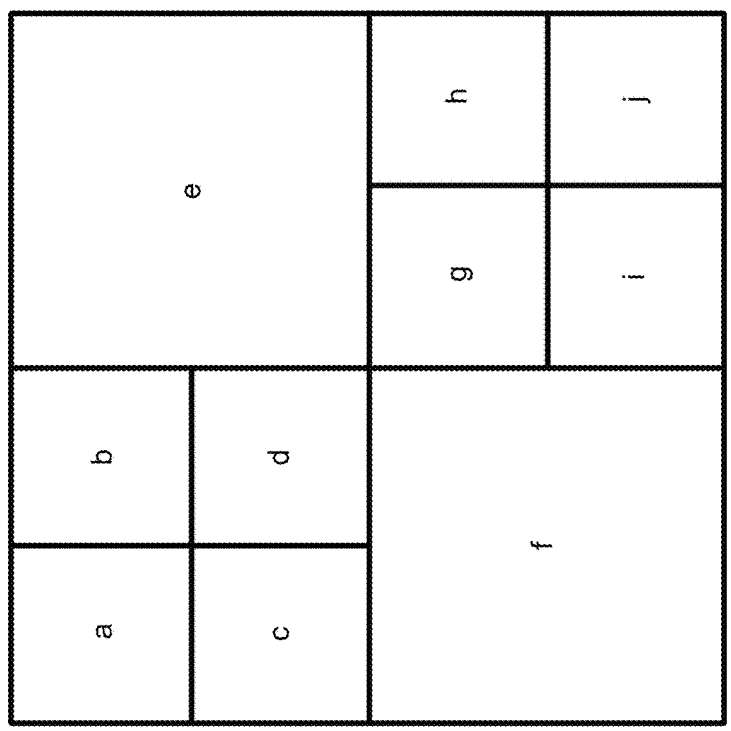

A RQT allows TU sizes from 4×4 up to 32×32 luma samples. FIG. 2 shows an example where a CU includes ten TUs, labeled with the letters a to j, and the corresponding block partitioning. Each node of the RQT may actually be a TU.

Individual TUs may be processed in depth-first tree traversal order, which is illustrated in FIG. 2 as alphabetical order, which follows a recursive Z-scan with depth-first traversal. The quadtree approach may enable the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, may be chosen by an encoder mode decision. For example, the choice of larger or smaller transform block sizes may be based on a rate-distortion optimization technique. The rate-distortion optimization technique may calculate a weighted sum of coding bits and reconstruction distortion, e.g., the rate-distortion cost, for each coding mode (e.g., a specific RQT splitting structure). Additionally, the rate-distortion optimization technique may select the coding mode with least rate-distortion cost as the best mode.

Three parameters may be defined in the RQT: a maximum depth of the RQT, a minimum allowed transform size of the RQT, and a maximum allowed transform size. The minimum and maximum transform sizes may vary within the range from 4×4 to 32×32 samples, which may correspond to the supported block transforms mentioned in the previous paragraph. The maximum allowed depth of the RQT may restrict the number of TUs. A maximum depth equal to zero may mean that a coding block (CB) cannot be split any further if each included transform block (TB) reaches the maximum allowed transform size, e.g., 32×32.

Each of the three parameters interact and influence the RQT structure. Consider a case in which a root CB size is 64×64, the maximum depth is equal to zero and the maximum transform size is equal to 32×32. In this case, the CB may be partitioned at least once, since otherwise it would lead to a 64×64 TB, which may not be allowed. The RQT parameters, e.g. maximum RQT depth, minimum and maximum transform size, may be transmitted in the bitstream at the sequence parameter set level. Regarding the RQT depth, different values may be specified and signaled for intra and inter coded CUs.

A quadtree transform may be applied for both intra and inter residual blocks. The DCT-II transform of the same size as a current residual quadtree partition may be applied for a residual block. However, if the current residual quadtree block is 4×4 and is generated by intra prediction, the above 4×4 DST-VII transform may be applied. In HEVC, larger size transforms, e.g., 64×64 transform, are not adopted mainly due to their limited benefit and relatively high complexity for relatively smaller resolution videos.

Despite the fact that DST Type-VII may efficiently improve intra coding efficiency compared to conventional DCT Type-II, transform efficiency may be relatively limited because prediction residuals present various statistics, and fixed usage of DCT Type-II and DST Type-VII may not efficiently adapt to all possible cases.

As described in Lim et al., "Rate-distortion optimized adaptive transform coding," Opt. Eng., vol. 48, no. 8, pp. 087004-1-087004-14, August 2009, a transform scheme adaptively employs an integer version of DCT or DST for prediction residue, for each block it is signaled whether the DCT or DST transform is used for the prediction residue. As described in Y. Ye and M. Karczewicz, "Improved H.264 intra coding based on bidirectional intra prediction, directional transform, and adaptive coefficient scanning," in Proc. 15th IEEE Int. Conf. Image Process., October 2008, pp. 2116-2119, each intra prediction mode can be mapped to a unique pair of transforms (e.g., C and R), a pre-defined as KLT pair, so that mode dependent transform (MDDT) applies. In this manner, different KLTs may be used for different intra prediction modes. However, which transform to use is predefined and dependent on the intra prediction mode.

However, as described in X. Zhao et al., "Video coding with rate-distortion optimized transform," IEEE Trans. Circuits Syst. Video Technol., vol. 22, no. 1, pp. 138-151, January 2012, more transforms may be used and such examples may explicitly signal an index (e.g., encode data indicative of the index) to the transforms from a pre-defined set of transform candidates which are derived from off-line training process. Similar to MDDT, in such examples, each intra prediction direction may have its unique set of pairs of transforms. An index may be signaled to specify which transform pair is chosen from the set. For example, there may be up to four vertical KLTs and up to four horizontal KLTs for smallest block sizes 4×. Therefore, in this example, 16 combinations may be chosen. For larger block sizes, a smaller number of combinations may be used. The techniques proposed in this disclosure may apply to both intra and inter prediction residual. In this disclosure, intra prediction residual refers to residual data generated using intra prediction. Furthermore, in this disclosure, inter prediction residual refers to residual data generated using inter prediction. For inter prediction residual, up to 16 combinations of KLTs may be chosen and an index to one of the combinations (four for 4×4 and sixteen for 8×8) may be signaled for each block.

As described in Saxena et al., "DCT/DST-based transform coding for intra prediction in image/video coding," IEEE Trans. Image Processing, and Yeo et al., "Mode-dependent transforms for coding directional intra prediction residuals," IEEE Trans. Circuits Syst. Video Technol., vol. 22, no. 4, pp. 545-554, 2012, multiple transforms may be used. However, in such examples, instead of using KLTs (which may be trained), either DCT (DCT-II) or DST (DST-VII) may be used for a transform unit (with both left and right transforms being the same) and which one to be used is determined by a signaled flag.

Furthermore, as described in Zou et al., "Rate-Distortion Optimized Transforms Based on the Lloyd-Type Algorithm for Intra Block Coding," IEEE Journal of Selected Topics in Signal Processing, Volume: 7, Issue: 6, November 2013, several pre-defined KLT pairs are used, an index to a transform pair may be signaled (instead of derived) for a coding unit, such that each TU of a CU uses the same pair of transforms.

As described in An et al., "Non-CE7: Boundary-Dependent Transform for Inter-Predicted Residue," JCTVC-G281, multiple transforms may be chosen for inter predicted residual of TUs according to their locations within a CU. Both the C and R transforms may be chosen from DST-VII and the flipped version of DST-VII.

Therefore, up to four combinations may be possible for the TUs within a CU. However, because the combination may be fully determined by the location of the PUs, there may be no need to signal which combination is being used.

In U.S. provisional application No. 62/137,038, filed Mar. 23, 2015, U.S. provisional application No. 62/107,996, filed Jan. 26, 2015, and U.S. patent application Ser. No. 15/005, 736, filed Jan. 25, 2016, an Enhanced Multiple Transforms (EMT) technique is proposed for both intra and inter prediction residual. In EMT, a CU-level flag may be signaled to indicate whether only the conventional DCT-2 or other non-DCT2 type transforms are used. If the CU-level is signaled as 1, a two-bit TU-level index may be further signaled for each TU inside the current CU to indicate which horizontal/vertical transform from a transform subset is used for the current TU. The transform subset may contain two transforms selected from DST-VII, DCT-VII, DCT-V and DST-I, and selection may be based on the intra prediction mode and whether it is a horizontal or a vertical transform subset.

Figure 3A:
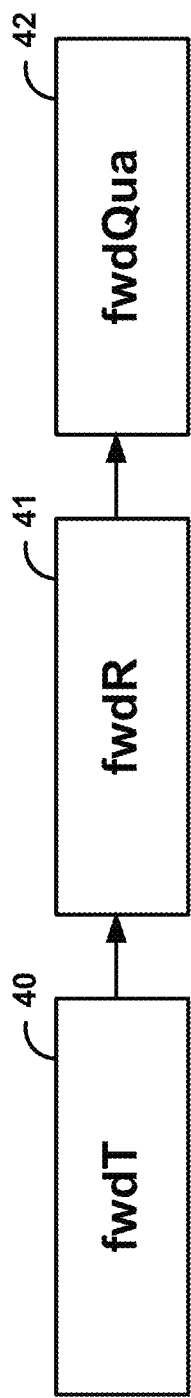
FIG. 3A is an illustration of a transform process at a video encoder.
Figure 3B:
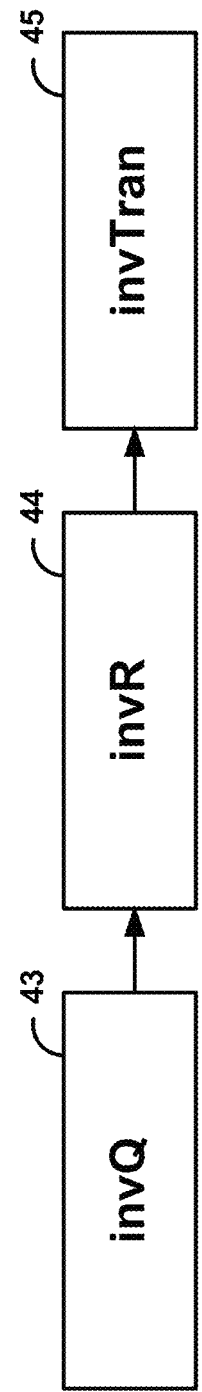
FIG. 3B is an illustration of a transform process at a video decoder.

FIG. 3A is an illustration of an example transform process at a video encoder, such as video encoder 20. FIG. 3B is an illustration of an example transform process at a video decoder, such as video decoder 30. In the example of FIG. 3A, video encoder 20 applies a forward primary transform 40 (fwdT), followed by a secondary transform 41 (fwdR), followed by forward quantization 42 (fwdQua). In the example of FIG. 3B, video decoder 30 applies inverse quantization 43 (invQ), followed by an inverse secondary transform 44 (invR), followed by an inverse primary transform 45 (invTran). Forward primary transform 40 may convert residual samples from a pixel domain to transform coefficients in a frequency domain. Inverse primary transform 43 may convert transform coefficients in the frequency domain to residual samples in the pixel domain.

Secondary transform 41 may be used for better energy compaction of transform coefficients. As illustrated in FIGS. 3A and 3B, secondary transform 41 may apply another transform on the transform coefficients derived from the first transform process.

Figure 4:
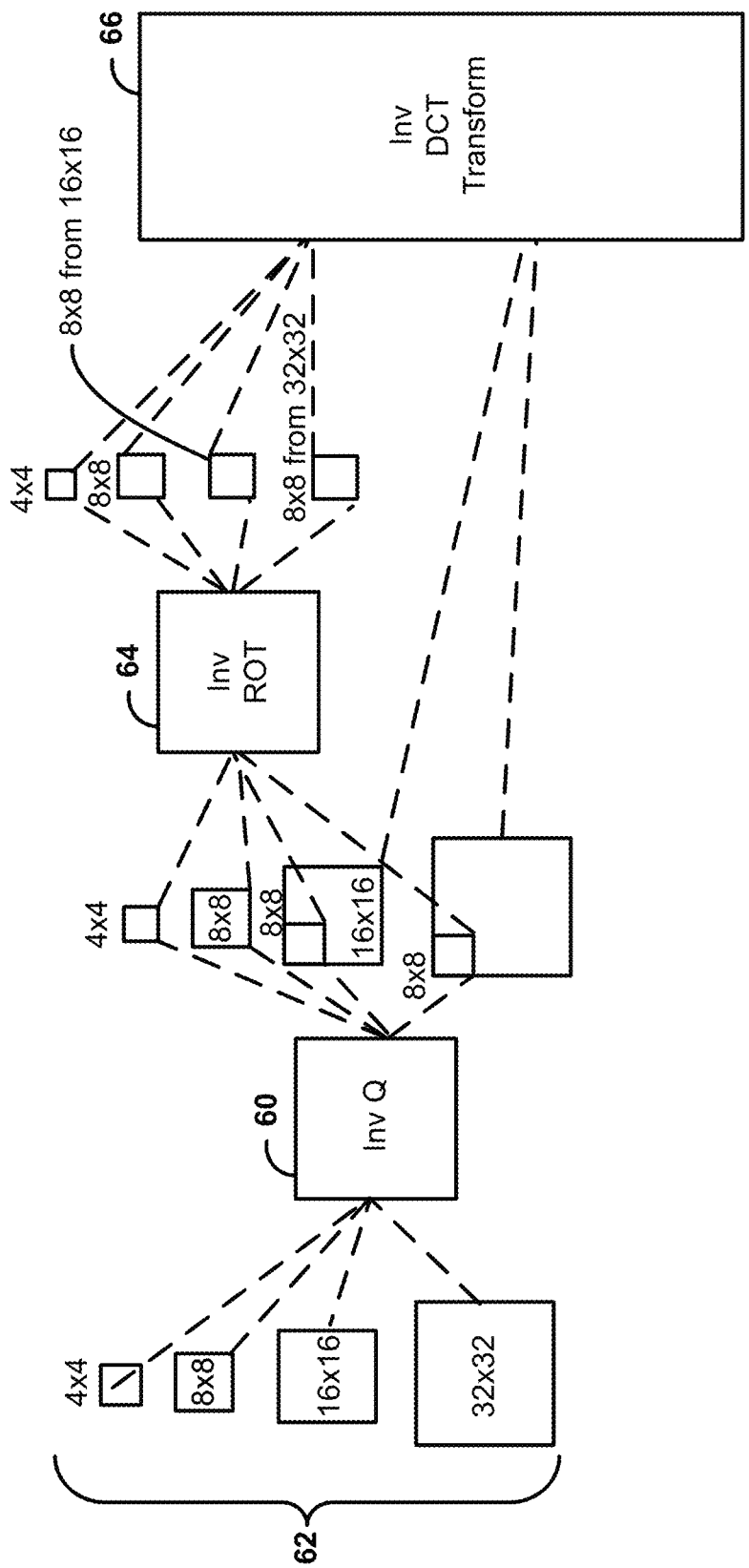
FIG. 4 is an illustration of an example rotational transform applied by a video decoder.

As described in E. Alshina, A. Alshin, F. Fernandes, A. Saxena, V. Seregin, Z. Ma, W.-J. Han (Samsung), "CE7: Experimental results of ROT by Samsung" Joint Collaborative Team on Video Coding (JCT-VC) of ITU-T SG16 WP3 and ISO/IEC JTC1/SC29/WG11, JCTVC-E380, Geneva, C H, 16-23 Mar. 2011, a secondary transform may be a rotational transform (ROT). The ROT does not replace the primary transform. However, the ROT is applied as a secondary transform for only the low frequency part of transform coefficients matrix. With the ROT as described in the above, for each intra coded TU, an index, indicating which ROT is applied from the four pre-defined transform candidates, is signaled. A 4×4 secondary transform is applied for 4×4 intra coded TUs, while 8×8 secondary transform is applied for 8×8 and larger intra coded TUs. For instance, in the example, the secondary transform may be specified as follows.

from 4×4 to 32×32. Furthermore, in the example of FIG. 4, the video decoder applies an inverse ROT 64 (Inv ROT) as a secondary transform for only a low frequency part of transform coefficients matrices. For instance, as shown in the example of FIG. 4, all transform coefficients of 4×4 and 8×8 transform coefficient matrices may be considered to be in low frequency parts of the transform coefficient matrices. However, as shown in FIG. 4, only transform coefficients in the top left 8×8 sub-blocks of 16×16 and 32×32 transform coefficient matrices are considered to be in low frequency parts of the transform coefficient matrices. Furthermore, in the example of FIG. 4, the video decoder applies an inverse DCT transform 66 (Inv DCT transform) to transform coefficient matrices to convert the transform coefficient matrices into residual blocks. In the example of FIG. 4, prior to applying inverse DCT transform 66 to 16×16 and 32×32 transform coefficient matrices, the video decoder may replace the top left 8×8 sub-blocks of the 16×16 and 32×32 transform coefficient matrices with the corresponding 8×8 transform coefficient matrices produced by application of inverse ROT 64.

As described in E. Alshina, A. Alshin, J.-H. Min, K. Choi, A. Saxena, M. Budagavi, "Known tools performance investigation for next generation video coding", ITU-T SG16 Doc. VCEG-AZ05, June 2015, ROT may be extended to a whole TU, not only the low-frequency part. More specifically, three 4×4 separable secondary transform candidates may be pre-defined, and the selected one may be explicitly signaled with a 2-bit index at the CU-level. The 2-bit index may be referred to herein as a ROT index. In one example, when the ROT index is 0, no secondary transform is applied. However, in this example, when the ROT index is 1, 2 and 3, the secondary transform corresponding to one of the three pre-defined secondary transform candidates may be applied for every TU inside a current CU. Given a selected secondary transform, for every 4×4 sub-block of the current TU, a secondary 4×4 separable secondary transform may be applied.

$$R_{vertical}(\alpha_1, \alpha_2, \alpha_3) = \begin{pmatrix} \cos\alpha_1\cos\alpha_3 - \sin\alpha_1\cos\alpha_2\sin\alpha_3 & -\sin\alpha_1\cos\alpha_3 - \cos\alpha_1\cos\alpha_2\sin\alpha_3 & \sin\alpha_2\sin\alpha_3 & 0 \\ \cos\alpha_1\sin\alpha_3 + \sin\alpha_1\cos\alpha_2\cos\alpha_3 & -\sin\alpha_1\sin\alpha_3 + \cos\alpha_1\cos\alpha_2\cos\alpha_3 & -\sin\alpha_2\cos\alpha_3 & 0 \\ \sin\alpha_1\sin\alpha_2 & \cos\alpha_1\sin\alpha_2 & \cos\alpha_2 & 0 \\ 0 & 0 & 0 & 1 \end{pmatrix}$$

$$R_{horizontal}(\alpha_4, \alpha_5, \alpha_6) = \begin{pmatrix} \cos\alpha_4\cos\alpha_6 - \sin\alpha_4\cos\alpha_5\sin\alpha_6 & -\sin\alpha_4\cos\alpha_6 - \cos\alpha_4\cos\alpha_5\sin\alpha_6 & \sin\alpha_5\sin\alpha_6 & 0 \\ \cos\alpha_4\sin\alpha_6 + \sin\alpha_4\cos\alpha_5\cos\alpha_6 & -\sin\alpha_4\sin\alpha_6 + \cos\alpha_4\cos\alpha_5\cos\alpha_6 & -\sin\alpha_5\cos\alpha_6 & 0 \\ \sin\alpha_4\sin\alpha_6 & \cos\alpha_4\sin\alpha_6 & \cos\alpha_5 & 0 \\ 0 & 0 & 0 & 1 \end{pmatrix}$$

In the four transform candidates illustrated above, one candidate corresponds to not applying a secondary transform and the other three candidates correspond to $R_{vertical}$ and $R_{horizontal}$ generated by three different settings of $\alpha 1$, $\alpha 2$, ..., $\alpha 6$. A more detailed description can be found in K. McCann, W.-J. Han, I.-K. Kim, J.-H. Min, E. Alshina, A. Alshin, T. Lee, J. Chen, V. Seregin, S. Lee, Y.-M. Hong, M.-S. Cheon, N. Shlyakhov, "Video coding technology proposal by Samsung (and BBC)" Joint Collaborative Team on Video Coding (JCT-VC) of ITU-T SG16 WP3 and ISO/IEC JTC1/SC29/WG11, JCTVC-A124, Dresden, Germany, 15-23 Apr. 2010.

FIG. 4 is an illustration of an example ROT applied by a video decoder, such as video decoder 30. In the example of FIG. 4, the video decoder performs inverse quantization 60 (Inv Q) on transform coefficient blocks 62 ranging in size The design of secondary transforms may apply a separable transform as the secondary transform. However, the secondary transform efficiency may be improved because a non-separable transform may provide superior coding gain on 2-D image blocks. Said differently, in the scenario of video coding, transform coefficients may be roughly non-correlated and sparse such that the energy of the input vector x may be compacted only on a few transform coefficients, and the remaining majority transform coefficients may be typically close to 0. In the example, a KLT, which is a non-separable transform, may have an optimal energy compaction because it uses eigenvectors of the covariance matrix of the input data as the transform basis vectors rather than merely transforming coefficients from a pixel domain to a frequency domain.

More specifically, separable transforms may capture the pixel correlation along horizontal and/or vertical directions.

In contrast, non-separable transforms may capture the correlation between any pair of two pixels in a 2-dimensional image block. Therefore, non-separable transforms may have more flexibility to reduce the data correlation than separable transforms. For example, for image blocks which show correlation along non-horizontal or non-vertical directions, e.g., a 45-degree edge texture, separable transforms may not be efficient to reduce the correlation between the pixels along a 45-degree direction, but non-separable may reduce the correlation efficiently.

In view of the problems discussed above, the following techniques are proposed. It should be understood that the techniques of the disclosure described below may be used in conjunction with techniques for adaptive cross-component residual prediction, such as those described in U.S. patent application Ser. No. 15/006,994 and U.S. Provisional Application 62/108,491. The following text describes itemized techniques proposed in this disclosure. Video encoder 20 and/or video decoder 30 may apply the itemized techniques individually. Alternatively, video encoder 20 and/or video decoder 30 may apply any combination of the itemized techniques.

In accordance with a first technique, video encoder 20 and/or video decoder 30 are configured to apply a non-separable secondary transform between the quantization and transform process. For instance, a non-separable transform set (including three non-separable transforms) applied for planar mode may be as follows.

| 246 | -36 | -35 | -2 | -41 | 9 | 6 | 0 | -27 | 6 | 6 | -1 | -2 | 0 | -1 | 0 |
|---|---|---|---|---|---|---|---|---|---|---|---|---|---|---|---|
| -42 | -220 | 39 | 26 | -100 | 20 | 18 | -3 | 28 | 38 | -9 | -6 | 5 | -2 | -2 | 1 |
| -18 | 106 | 3 | -17 | -222 | -16 | 51 | 4 | 24 | -19 | -6 | 3 | 23 | 1 | -7 | 0 |
| -30 | -36 | -150 | 17 | -11 | -181 | 6 | 30 | -59 | 17 | 45 | -4 | 9 | 25 | -2 | -5 |
| -30 | -3 | -192 | 13 | -8 | 150 | 2 | -30 | 50 | 4 | 29 | 0 | 5 | -24 | -2 | 6 |
| -31 | -7 | 18 | 7 | -24 | 76 | 13 | -15 | -230 | -33 | 49 | 4 | 26 | -7 | -6 | 3 |
| 3 | 22 | 10 | 16 | 47 | 8 | 208 | 1 | -6 | 127 | 2 | -28 | 13 | -6 | -43 | 1 |
| -2 | 38 | 11 | -11 | -28 | 11 | -129 | -6 | -23 | 204 | 10 | -42 | 46 | -3 | 10 | 3 |
| 11 | 21 | 8 | 215 | 6 | -2 | -18 | 5 | 11 | -31 | -41 | -37 | 116 | 9 | -23 | 3 |
| -4 | 25 | 4 | 117 | -27 | 1 | -5 | 3 | -21 | 28 | 4 | -34 | -209 | -38 | 54 | 7 |
| -9 | -7 | -48 | -33 | -2 | -13 | 0 | -29 | -55 | 6 | -233 | -8 | -7 | -55 | -5 | 17 |
| 4 | -4 | 14 | -3 | 3 | -36 | -7 | 5 | 13 | -11 | 54 | 11 | 32 | -238 | -27 | 49 |
| 3 | 1 | 10 | 7 | 0 | -44 | 5 | -246 | 8 | -5 | 27 | -7 | 1 | 16 | 7 | 42 |
| -2 | 0 | 0 | -2 | -8 | 0 | -42 | -9 | 0 | -8 | 4 | -30 | -61 | 16 | -241 | -22 |
| 1 | 8 | 1 | 48 | -3 | -1 | -7 | -8 | -5 | 51 | -13 | 243 | -12 | 7 | -28 | 2 |
| 0 | 0 | 0 | -5 | 0 | 7 | -2 | 44 | 1 | -1 | 2 | -3 | -8 | 51 | -17 | 246 |
| -242 | 48 | 31 | 1 | 51 | -7 | -8 | -1 | 26 | -10 | -3 | 1 | 1 | 1 | 1 | 0 |
| -60 | -155 | 43 | 12 | -173 | 30 | 37 | -2 | 45 | 34 | -14 | -4 | 15 | -7 | -3 | 1 |
| -4 | -187 | 13 | 28 | 161 | -21 | -30 | 2 | -25 | 32 | 0 | -6 | -23 | 6 | 6 | -1 |
| -31 | -10 | -63 | 12 | -49 | -189 | 37 | 26 | -120 | 30 | 51 | -7 | 25 | 34 | -12 | -5 |
| 22 | 25 | 225 | -16 | -1 | -10 | 20 | -3 | -111 | -1 | -20 | 2 | 1 | 11 | -4 | -1 |
| 38 | 12 | 68 | -12 | 14 | -154 | 4 | 27 | 175 | 6 | -52 | 3 | -24 | 18 | 1 | -6 |
| 6 | 41 | -6 | 10 | 44 | 31 | 118 | -12 | 18 | 198 | -23 | -42 | 50 | -21 | -46 | 8 |
| 2 | -19 | -9 | 26 | 36 | 9 | 212 | -4 | 10 | -125 | 10 | 11 | -42 | 1 | -22 | 3 |
| 10 | -15 | 7 | 41 | 24 | -6 | -10 | 3 | 16 | -71 | -34 | 9 | 232 | 0 | -50 | 5 |
| -7 | -33 | -16 | -241 | 17 | -2 | 24 | -27 | 1 | -1 | 12 | 53 | 37 | 6 | -17 | 1 |
| -10 | -4 | -44 | -10 | -9 | -32 | 1 | -33 | -59 | -16 | -212 | 5 | -26 | -100 | 14 | 38 |
| 5 | -2 | 27 | -3 | 5 | -30 | -2 | 27 | 15 | -5 | 104 | 5 | 13 | -224 | 16 | 40 |
| 4 | 1 | 9 | 24 | -4 | -37 | -11 | -243 | 17 | -6 | 41 | -18 | 0 | 4 | -3 | 45 |
| 3 | 4 | 0 | 2 | 9 | 1 | 44 | -6 | 3 | 18 | -1 | 19 | 58 | 20 | 243 | 6 |
| 1 | 7 | 0 | 54 | 0 | 0 | 2 | -13 | 0 | 43 | 2 | 245 | -10 | 1 | -22 | 5 |
| 0 | 0 | 2 | -4 | 0 | 8 | -4 | 47 | 3 | 0 | 9 | -3 | -5 | 53 | -7 | 245 |
| -251 | 21 | 33 | 5 | 18 | -7 | 1 | -1 | 27 | -1 | -6 | 0 | 6 | -1 | 0 | 0 |
| 23 | 194 | -14 | -21 | 152 | 40 | -28 | -9 | -4 | -32 | -5 | 4 | -14 | -8 | 4 | 2 |
| 0 | -150 | -31 | 19 | 192 | -10 | -49 | 0 | 26 | 33 | -2 | -4 | -20 | 2 | 7 | 0 |
| -19 | 20 | -120 | -2 | -7 | -187 | -56 | 27 | -76 | -62 | 29 | 16 | -3 | 22 | 14 | -3 |
| 26 | -5 | 203 | 19 | 47 | -102 | 41 | 26 | -73 | -44 | -26 | 4 | -19 | 8 | -2 | -4 |
| 33 | 34 | 24 | -5 | -10 | -105 | -23 | 17 | 212 | 19 | -60 | -3 | 34 | 23 | -10 | -4 |
| 1 | 45 | -6 | 1 | 22 | -53 | 79 | 15 | -32 | 205 | 74 | -34 | 23 | 58 | -4 | -16 |
| 0 | 15 | 59 | -8 | -41 | 10 | -210 | -34 | -49 | 89 | -46 | -29 | 4 | 18 | 37 | 2 |
| 3 | 24 | -23 | 230 | -3 | 23 | -10 | 71 | -12 | -5 | -41 | -41 | 45 | 6 | -17 | -13 |
| 1 | -18 | 1 | -50 | 28 | 15 | 2 | -21 | -41 | -30 | -34 | 9 | 226 | 58 | -57 | -8 |
| 8 | -2 | 53 | 33 | -3 | 25 | -55 | 25 | 51 | -48 | 203 | 45 | 45 | 49 | 69 | -1 |
| -4 | -6 | -14 | -4 | -3 | 34 | 26 | -16 | 0 | -40 | -55 | -18 | -62 | 223 | 55 | -41 |
| 5 | 4 | 2 | 65 | 3 | -41 | 24 | -221 | 12 | -26 | 34 | -84 | 8 | -7 | 8 | 34 |
| -1 | 0 | 13 | -1 | -7 | 6 | -50 | -8 | 8 | -16 | 60 | -18 | -60 | 44 | -223 | -57 |
| 1 | 8 | -2 | 58 | -2 | -6 | 2 | -67 | -7 | 43 | -28 | 219 | -15 | 32 | -34 | 65 |
| -1 | -1 | 1 | -14 | 0 | 7 | -6 | 52 | 0 | -8 | 10 | -60 | -10 | 49 | -40 | 234 |

In one aspect of this example, the non-separable secondary transform may be KLTs, which may be derived from off-line training, or analytically derived off-line using an assumed image correlation model. In some examples, an image correlation model is a function f(x,y), which measures the covariance between the i th and j th elements of a random vector. A random vector may be a random variable with multiple dimensions. Said differently, an image correlation function may be symmetric: f(x,y)=f(y,x), and the covariance matrix Cov(x,y)=f(x,y) may be semi-positive definite. An example of a correlation model is $f\{x*y\}=\rho^{|x-y|}$, where $0 \leq \rho \leq 1$.

In one aspect of this example, the non-separable secondary transform may be KLTs, which may be derived from off-line training, or analytically derived off-line using KLTs derived on-line during the encoding/decoding process. In some instances, during the encoding/decoding process, video encoder 20 and/or video decoder 30 are configured to collect the statistics of the transform coefficients, and update, where secondary transform is applied, the correlation matrix of the transform coefficients. Based on the updated correlation matrix, video encoder 20 and/or video decoder 30 may be configured to extract the Eigen vectors and derive KLT transform cores as a matrix composed of all the Eigen vectors arranged in the order of their corresponding Eigen values.

In accordance with an example of the first technique, video encoder 20 may form a residual video block. In some examples, as part of forming the residual video block, video encoder 20 subtracts one or more predictive blocks from a video block being coded. Additionally, video encoder 20 may apply a first transform to the residual video block to generate a first coefficient block. In this example, the first transform converts the residual video block from a pixel domain to a frequency domain. As used herein, a pixel domain or a spatial domain may refer to domains where changes in a value for a pixel correspond to changes in the luminance and/or color for that pixel. As used herein, however, a frequency domain may refer to a domain where changes in a value for a pixel correspond to changes in a rate at which the pixel values for the pixel are changing in the pixel domain. Furthermore, video encoder 20 may apply a secondary transform to at least part of the first coefficient block to generate a second coefficient block. In accordance with the first technique of this disclosure, the second transform is a non-separable transform, such as a KLT. Video encoder 20 may then quantize the second coefficient block.

Similarly, in accordance with an example of the first technique, video decoder 30 may inverse quantize a first coefficient block. Additionally, in this example, video decoder 30 may apply a first inverse transform (i.e., an inverse secondary transform) to at least part of the inverse quantized first coefficient block to generate a second coefficient block. In accordance with the first technique of this disclosure, the first inverse transform is a non-separable transform, such as a KLT. Furthermore, in this example, after applying the first inverse transform to generate the second coefficient block, video decoder 30 may apply a second inverse transform to the second coefficient block to generate a residual video block. In this example, the second inverse transform converts the second coefficient block from a frequency domain to a pixel domain. Additionally, in this example, video decoder 30 may form a decoded video block. In some examples, as part of forming the decoded video block, video decoder 30 sums the residual video block with one or more predictive blocks. For instance, video decoder 30 may sum the residual video block with one or more predictive blocks and form a decoded video block based on the sum of the residual video block with one or more predictive blocks.

In accordance with a second technique, video encoder 20 and/or video decoder 30 perform a pre-selection from three or more non-separable transform candidates to formulate a subset of non-separable transforms. In some examples, the subset of non-separable transforms may refer to KLTs, which are derived by off-line training and the transform cores are hard coded as fixed numbers for both encoder 20 and/or decoder 30. Video encoder 20 and/or video decoder 30 may choose the final transform to be used for a current TU from the subset of transforms.

For example, video encoder 20 may formulate a subset of a set of non-separable transforms that includes three or more non-separable transform candidates. In this example, video encoder 20 may select one candidate from the subset of the set of non-separable transforms as the first inverse transform. In some aspects of this example, the set of non-separable transforms includes twelve transform subsets, the twelve transform subsets including the subset of the set of non-separable transforms. In some aspects of this example, the set of non-separable transforms is specified by a luma intra prediction mode for the video data. For instance, video encoder 20 may specify that a first luma intra prediction mode for the video data is used with a first set of non-separable transforms and may specify that a second luma intra prediction mode for the video data is used with a second set of non-separable transforms. More specifically, video encoder 20 may specify a transform candidate by a signaled index (e.g., data indicative of an index) and the selected transform subset.

Similarly, video decoder 30 may formulate a subset of a set of non-separable transforms that includes three or more non-separable transform candidates. In this example, video decoder 30 may select one candidate from the subset of the set of non-separable transforms as the second transform. In some aspects of this example, the set of non-separable transforms includes twelve transform subsets, the twelve transform subsets including the subset of the set of non-separable transforms. In some aspects of this example, the set of non-separable transforms is specified by a luma intra prediction mode for the video data.

In an example, the pre-selection to formulate the subset of transforms may be determined by already decoded information such as intra prediction modes, EMT CU-level and/or TU-level indices, RQT depth, quantized coefficients, reference prediction block, relative location of the current TU inside a PU (which boundary of the current PU is the TU located), block sizes, block shape (whether it is square or non-square block, and the ratio of height versus width). Said differently, video decoder 30 may preselect a subset of transforms according to the decoded information rather than relying on separate or additional signaling. For example, video encoder 20 may determine the subset based on decoded information, the decoded information comprising one or more of an intra prediction mode, a CU level EMT index, a TU level EMT index, a residual quadtree depth, quantized coefficients, a reference prediction block, and a relative location of a current TU inside a PU. In some aspects of this example, twelve transform subsets are applied, and a look-up table specifying the mapping from intra prediction mode to transform subset selection is predefined, given the intra prediction mode and this look-up table, a transform subset, which includes three different non-separable transforms, is firstly selected, then one of the three non-separable transforms is further specified by decoded information and used to perform the first transform. Similarly, in some aspects of this example, video decoder 30 may determine the subset based one or more of an intra prediction mode, a CU level EMT index, a TU level EMT index, a residual quadtree depth, quantized coefficients, a reference prediction block, a relative location of a current TU inside a unit PU, block sizes, and block shape (whether it is square or non-square block, and the ratio of height versus width).

In accordance with some examples of the second technique, the number of subsets of transforms may be limited to a small integer, e.g., 1, 2, 3, 4, 12, or 34. Additionally, in some aspects of this example, different subsets of transforms may contain different types of transforms. For example, video encoder 20 may preselect a first subset having one or more left transforms, a second set having or more right transforms, or a third set having left and right transforms as a preselected subset. Then, in the example, video encoder 20 may select one transform candidate from the preselected subset as a selected transform. For instance, video encoder

20 may select a transform using an encoder mode decision, and video encoder 20 encodes data indicative of an index of the transform. Similarly, video decoder 30 may decode an index from a bitstream and select the transform based on the decoded index from the set of preselected transforms.

In some examples, a total number of transform candidates in transform subsets of the set of non-separable transforms that correspond to different intra prediction modes are different. For example, video encoder 20 and/or video decoder 30 may use a first subset for a first intra prediction mode and a second subset for a second intra prediction mode.

In an example, there are a total of 12 transform subsets. In this example, each respective transform subset of the 12 transform subsets contains three non-separable transform candidates. The transform subset may be specified by the luma intra prediction mode, and for different intra modes, the same transform set may be applied. As used herein, intra prediction modes may refer to various direction of prediction for a block being predicted. Examples of intra prediction modes may include, but are not limited to, vertical, horizontal, diagonal down-left, diagonal down-right, vertical-right, horizontal-down, vertical-left, horizontal-up, and other directions of prediction for a block being predicted. Said differently, in some aspects of this example, the set of non-separable transforms is specified by a luma intra prediction mode for the video data. For example, video decoder 30 may select one transform subset of the 12 transform subsets for a particular luma intra prediction mode. In an aspect of the example, video decoder 30 may select a first transform of the three non-separable transform candidates contained in the selected subset for the first intra prediction mode and may select a second transform of the three non-separable transform candidates contained in the selected subset for a second intra prediction mode.

In an example, there are a total of 12 transform subsets, and each transform subset may contain five non-separable transform candidates. The transform set may be specified by the luma intra prediction mode and EMT CU-level and TU-level indices. For different intra modes, the same transform set may be applied.

In an example, the transform subset may contain only one transform. For different TU sizes, the number of transforms in a transform subset may be different, a typical number of may be, but not limited to 2, 3 and 4. For different intra prediction modes, the number of transforms in a transforms subset may be different, a typical number may be, but not limited to 2, 3 and 4. In an aspect of the example, for planar or DC prediction mode, the number of transforms in a transforms subset is 2, while for other prediction modes, the number of transforms in a transforms subset is 3.

Figure 5:
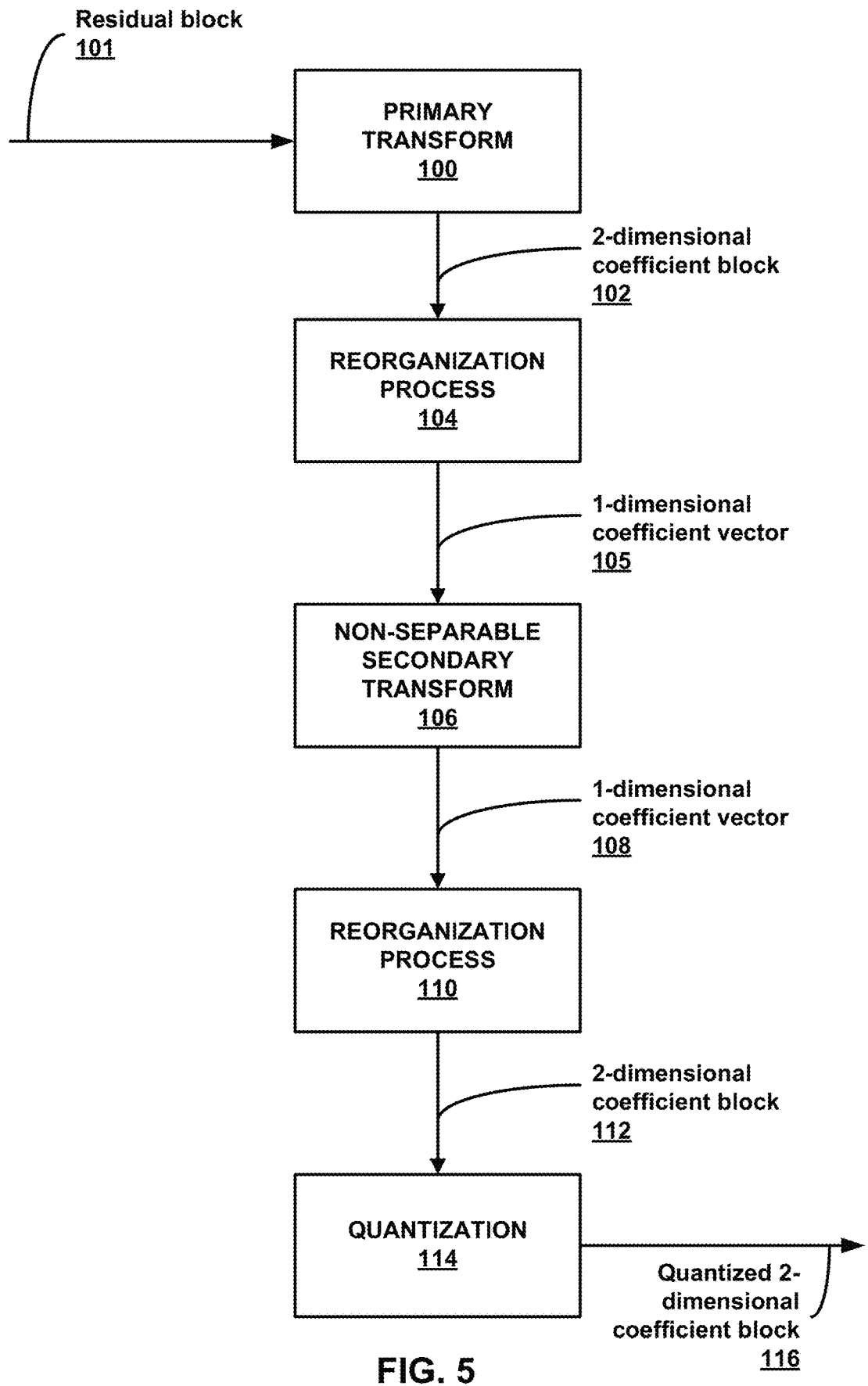
FIG. 5 is a block diagram illustrating an example encoding process that includes a secondary transform coefficient reorganization process.
Figure 6:
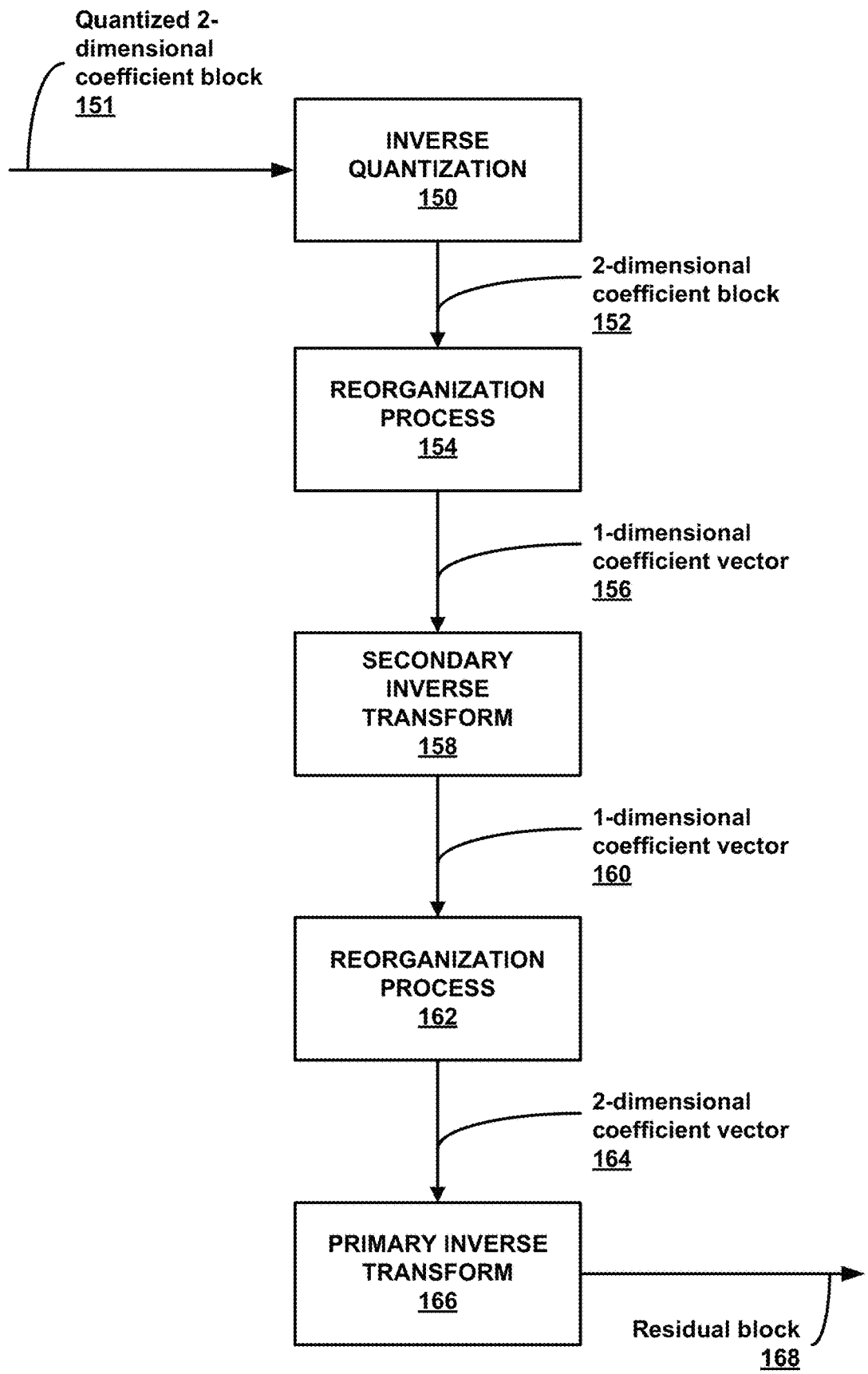
FIG. 6 is a block diagram illustrating an example decoding process that includes a secondary transform coefficient reorganization process.

FIG. 5 and FIG. 6 relate to a third technique of this disclosure. FIG. 5 is a block diagram illustrating a portion of an example encoding process that includes a secondary transform coefficient reorganization process. FIG. 6 is a block diagram illustrating a portion of an example decoding process that includes a secondary transform coefficient reorganization process. In FIG. 5, video encoder 20 applies a primary transform 100 to a residual block 101 to generate a 2-dimensional coefficient block 102. Furthermore, the encoding process of FIG. 5, includes a non-separable secondary transform 106. Non-separable secondary transform 106 may take a 1-dimensional coefficient vector 156 as input and generate in a 1-dimensional coefficient vector 108 as output. Thus, in the example of FIG. 5, primary transform 100 generates 2-dimensional coefficient block 102, but non-separable secondary transform 106 takes a 1-dimensional coefficient vector as input. Accordingly, video encoder 20 may perform a reorganization process 104 to transform 2-dimensional coefficient block 102 into 1-dimensional coefficient vector 105. In some examples, reorganization process 104 may be considered to be part of non-separable secondary transform 106.

Furthermore, quantization process 114 may take a 2-dimensional coefficient block 112 as input and may output a quantized 2-dimensional coefficient block 116. Thus, in accordance with the third technique of this disclosure, video encoder 20 may apply a secondary transform coefficient reorganization process 110 for reorganizing the 1-dimensional coefficient vector 108 derived by non-separable secondary transform 106 as a 2-dimensional coefficient block 112 after video encoder 20 applies secondary transform 106 during encoding. Applying reorganization process 110 may obviate the need to modify quantization process 106 to accept 1-dimensional coefficient vectors.

In FIG. 6, video decoder 30 may apply an inverse quantization 150 to a quantized 2-dimensional coefficient block 151 to derive 2-dimensional coefficient block 152. Furthermore, the decoding process of FIG. 6 includes an inverse secondary transform 158. Inverse secondary transform 158 may take a 1-dimensional coefficient vector 156 as input and output a 1-dimensional coefficient vector 160. For example, inverse secondary transform 158 may take a 16×1 coefficient vector as input and may output a 16×1 coefficient vector. However, inverse quantization 150 may output 2-dimensional coefficient block 152 and primary inverse transform 166 may take a 2-dimensional coefficient block 164 as input. Hence, in accordance with the third technique of this disclosure, before video decoder 30 applies secondary inverse transform 158 during the decoding process, video decoder 30 may apply a secondary transform coefficient reorganization process 154 for reorganizing 2-dimensional coefficient block 152 derived by inverse quantization 150 as 1-dimensional coefficient vector 156. Applying reorganization process 154 before applying inverse secondary transform 158 may obviate the need to modify inverse quantization 150 to generate a 1-dimensional coefficient vector. Moreover, video decoder 30 may apply a secondary transform coefficient reorganization process 162 for reorganizing 1-dimensional coefficient vector 160 as 2-dimensional coefficient block 164. Video decoder 30 may then apply primary inverse transform 166 to 2-dimensional coefficient block 164 to generate residual block 168. Applying reorganization process 162 before applying primary inverse transform 166 may obviate the need to modify primary inverse transform 166. In some examples, reorganization process 162 is considered part of secondary inverse transform 158.

Hence, in accordance with the third technique, video encoder 20 may form a residual video block. As part of forming the residual video block, video encoder 20 may subtract one or more predictive blocks from a video block being coded. Additionally, video encoder 20 may apply a first transform (e.g., primary transform 100) to at least part of the residual video block to generate a first 2-dimensional coefficient block (e.g., 2-dimensional coefficient block 102). In this example, the first transform converts the residual video block from a pixel domain to a frequency domain. Additionally, video encoder 20 may reorganize the first 2-dimensional coefficient block as a first 1-dimensional coefficient vector. In the example, video encoder 20 may apply a second transform to at least part of the first 1-dimensional coefficient vector to generate a second 1-dimensional coefficient vector. In this example, the second transform is a non-separable transform. In the example, the second transform is a non-separable transform. In this example, video encoder 20 may reorganize the second 1-dimensional coefficient vector as a second 2-dimensional coefficient block according to a coefficient scanning order.

Similarly, video decoder 30 may reorganize a first 2-dimensional coefficient block (e.g., 2-dimensional coefficient block 152) as a first 1-dimensional coefficient vector (e.g., 1-dimensional coefficient vector 156) according to a coefficient scanning order. In this example, video decoder 30 may apply a first inverse transform (e.g., non-separable secondary inverse transform 158) by multiplying a non-separable transform matrix by the first 1-dimensional coefficient vector to generate a second 1-dimensional coefficient vector (e.g., 1-dimensional coefficient block 160). In this example, the first inverse transform is a non-separable transform. In this example, video decoder 30 may reorganize the second 1-dimensional coefficient vector as a 2-dimensional coefficient block (e.g., 2-dimensional coefficient block 164). Video decoder 30 may apply a second inverse transform (e.g., primary inverse transform 166) to the second 2-dimensional coefficient block to generate a residual video block (e.g., residual block 168). In this example, the second inverse transform converts the second 2-dimensional coefficient block from a frequency domain to a pixel domain. In this example, video decoder 30 may form a decoded video block. As part of forming the decoded video block, video decoder 30 may sum the residual video block with one or more predictive blocks.

In some examples of the third technique, applying the second transform comprises multiplying a 2-dimensional transform matrix by the first 1-dimensional coefficient vector. In some instances of the example, the first 2-dimensional coefficient block is a 4×4 block and the 2-dimensional transform matrix is a 16×16 non-separable transform matrix selected by a luma intra prediction mode and a coding unit-level index. For example, video encoder 20 may apply a second transform (e.g., non-separable secondary transform 106) by multiplying a 16×16 non-separable transform matrix by the first 1-dimensional coefficient vector (e.g., 1-dimensional coefficient vector 105), thereby generating the second 1-dimensional coefficient vector (e.g., 1-dimensional coefficient vector 108). Similarly, video decoder 30 may apply a second transform (e.g., non-separable secondary transform 158) by multiplying a 16×16 non-separable transform matrix by the first 1-dimensional coefficient vector (e.g., 1-dimensional coefficient vector 156), thereby generating the second 1-dimensional coefficient vector (e.g., 1-dimensional coefficient vector 160).

In some examples of the third technique, the secondary transform coefficient reorganization process performed on a 4×4 coefficient group may depend on a coefficient scanning order of the 4×4 coefficient group. For example, if video encoder 20 uses a zig-zag scanning order to process syntax element representing coefficients of the 4×4 coefficient group during entropy encoding, video encoder 20 may use the same zig-zag scanning order when reorganizing the 4×4 coefficient group into a 16×1 coefficient vector as part of applying the non-separable secondary transform.

Furthermore, in some examples of the third technique, video encoder 20 may determine a coefficient scanning order for the 4×4 coefficient group. In this example, video encoder 20 may reorganize a first 1-dimensional coefficient vector as a first 2-dimensional coefficient block (e.g., the 4×4 coefficient group) based on the determined coefficient scanning order. In some aspects of this example, video encoder 20 may reorganize the first 1-dimensional coefficient vector as the first 2-dimensional coefficient block such that the first 2-dimensional coefficient block has a coefficient scanning order corresponding to (e.g., matching) the determined coefficient scanning order.

Similarly, video decoder 30 may determine a coefficient scanning order for a 4×4 coefficient group. In this example, video decoder 30 may reorganize second 2-dimensional coefficient block (e.g., the 4×4 coefficient group) as a second 1-dimensional coefficient vector based on the determined coefficient scanning order. In some aspects of this example, video decoder 30 may reorganize the second 2-dimensional coefficient block as the second 1-dimensional coefficient vector such that the second 1-dimensional coefficient vector has a coefficient scanning order corresponding to (e.g., matching) the determined coefficient scanning order.

In some examples of the third technique, the secondary transform coefficient reorganization process performed on a 4×4 coefficient group may depend on already encoded/decoded information, such as intra prediction modes, EMT CU-level and/or TU-level indices, RQT depth, and/or quantized coefficients. Said differently, reorganization process 110 of video encoder 20 may reorganize, based on intra prediction modes, EMT CU-level and/or TU-level indices, RQT depth, and/or quantized coefficients, 1-dimensional coefficient vector 108 as 2-dimensional coefficient block 112. For example, video encoder 20 may reorganize 1-dimensional coefficient vector 108 as 2-dimensional coefficient block 112 based on whether a vertical or horizontal luma prediction mode is selected such that the 1-dimensional coefficient vector has a coefficient scanning order corresponding (e.g., matching) the determined coefficient scanning order. Similarly, reorganization process 154 of video decoder 30 may reorganize, based on intra prediction modes, EMT CU-level and/or TU-level indices, RQT depth, and/or quantized coefficients, 2-dimensional coefficient block 152 to generate 1-dimensional coefficient vector 156.

In one example of the third technique, after applying the non-separable secondary transform (e.g., secondary transform 102) for a particular 4×4 coefficient block, video encoder 20 may derive a 16×1 coefficient vector (e.g., 1-dimensional coefficient vector 108) and may reorganize the resulting 16 coefficients as a 4×4 block (e.g., 2-dimensional coefficient block 112) according to (i.e., along) the coefficient scanning order for the particular 4×4 block. Video encoder 20 may perform the reorganization of the 16 coefficients in a way that coefficients with smaller indices are placed at locations with the smaller scanning index in the 4×4 coefficient block. For example, when the 4×4 coefficient block is scanned row-by-row from a top of the 4×4 coefficient block to the bottom of the 4×4 coefficient block (e.g., according to an intra prediction mode), video encoder 20 may reorganize the four coefficients of the top row of the coefficient block as the first four coefficients of the 1-dimensional coefficient vector, the four coefficients of the second-to-top row of the coefficient block as the next four coefficients of the 1-dimensional coefficient vector, and so on.

After performing dequantization on the TU coefficients, video decoder 30 may, for each 4×4 sub-block of a current TU, derive a 4×4 dequantized secondary transform coefficients block (e.g., 2-dimensional coefficient block 152). Furthermore, for each respective 4×4 sub-block of the current TU, video decoder 30 may reorganize the 16 coefficients in the respective 4×4 dequantized block as a respective 16×1 vector (e.g., 1-dimensional coefficient vector 156) based on a coefficient scanning order for the 4×4 block. Video decoder 30 may perform the reorganization of the 4×4 coefficients in a way that coefficients with smaller scan indices are placed at locations with the smaller indices in the 16×1 coefficient vector.

In an example, video encoder 20 and/or video decoder 30 may perform the reorganization process based on a fixed 4×4 coefficient scanning order, e.g., horizontal, vertical, diagonal, or zigzag scanning order. In this manner, the 16 secondary transform coefficients with smaller indices in the 16×1 coefficient vector may be placed in a 4×4 coefficient block according to a fixed pre-defined 4×4 coefficient scanning order.

In accordance with an example of the third technique, after the transform process (e.g., primary transform 100), video encoder 20 may apply the secondary transform (e.g., secondary transform 102) for each respective 4×4 transform coefficient sub-block B of a current M×N TU by first representing B as a vector $\vec{b}$ using $\vec{b}(i \cdot N+j)=B(i,j)$ and then performing the following calculation:

$$\vec{f} = T \cdot \vec{b}.$$

In the equation above, T is a 16×16 non-separable transform matrix selected based on a luma intra prediction mode and a signaled CU-level flag as described above. Furthermore, in the example of FIG. 5, $\vec{b}$ may correspond to 1-dimensional coefficient vector 105. As a consequence of applying the equation above, for each respective 4×4 sub-block, video encoder 20 derives a respective 16×1 secondary transform coefficient vector $\vec{f}$. In the example of FIG. 5, $\vec{f}$ corresponds to 1-dimensional coefficient vector 108. Video encoder 20 may reorganize the respective 16×1 secondary transform coefficient vector as a respective 4×4 coefficient block by performing the following operation:

$$F(\text{scan}\_x(j),\text{scan}\_y(j))= \vec{f}(j).$$

In the equation above, j=0, 1, . . . , 15, scan_x and scan_y may be a scan table for an x- and y-coordinate as already defined in HEVC, respectively. In this way, the respective 4×4 transform coefficient sub-block B may be replaced by a respective derived secondary 4×4 transform coefficient block F. In the example of FIG. 5, F corresponds to 2-dimensional coefficient bock 112. After video encoder 20 has performed the secondary transform for each 4×4 transform coefficient sub-block, video encoder 20 may further quantize and entropy encode the updated M×N coefficient block.

For each respective 4×4 coefficient sub-block F, after the quantization process (e.g., inverse quantization 150), video decoder 30 may derive a 16×1 secondary transform coefficient vector $\vec{f}$ by reorganizing the respective 4×4 coefficient sub-block F to a 16×1 vector.

$$\vec{f}(j)=F(\text{scan}\_x(j),\text{scan}\_y(j)).$$

In this equation above, j=0, 1, . . . , 15, scan_x and scan_y are a scan table for x- and y-coordinates of the 4×4 coefficient sub-block F as already defined in HEVC, respectively.

In the example of FIG. 6, $\vec{f}$ corresponds to 1-dimensional coefficient vector 156 and F corresponds to 2-dimensional coefficient block 152. Video decoder 30 may then apply the inverse secondary transform (e.g., secondary inverse transform 158) on $\vec{f}$ by performing the following calculation:

$$\vec{b} = T' \cdot \vec{f},$$

In the equation above, T' is a 16×16 non-separable transform matrix that may be selected by a luma intra prediction mode and a signaled CU-level flag as described in above. As a consequence of the matrix multiplication of the equation above, for each respective 4×4 sub-block i, video decoder 30 derives a respective 16×1 secondary transform coefficient vector $\vec{b}$. In the example of FIG. 6, $\vec{b}$ corresponds to dimensional coefficient vector 160. Video decoder 30 reorganizes the 16×1 secondary transform coefficient vector as a 4×4 coefficient block by calculating $B(i,j)= \vec{b}(i \cdot N+j)$. In the example of FIG. 6, B corresponds to 2-dimensional coefficient block 164. Video decoder 30 may replace the 4×4 transform coefficient sub-block F by the derived secondary 4×4 transform coefficient block B. After video decoder 30 performs the inverse secondary transform for each of the 4×4 coefficient sub-lock, video decoder 30 may input the updated M×N coefficient block to the inverse transform (e.g., primary inverse transform 166).

As indicated above, in some examples, video encoder 20 may select a non-separable secondary transform. In accordance with a fourth technique, video encoder 20 may signal (e.g., encode) and video decoder 30 may receive an indication of the selection of non-separable secondary transform using an index applicable to a TU, PU, CU or any image coding block unit. In other words, video encoder 20 may encode, for a TU, PU, CU or other image coding block unit, data indicative of an index indicating a selected non-separable secondary transform. For example, the selection of the first inverse transform from the set of non-separable transforms may be signaled by an index for a TU, a PU, a CU, or a combination thereof. Similarly, video decoder 30 may obtain, from a bitstream of the video data, data indicative of an index for a TU, a PU, a CU, or a combination thereof, the index indicating a selected non-separable secondary transform. For ease of explanation, this disclosure may refer to the index indicating the selected non-separable secondary transform as a non-separable secondary transform (NSST) index.

In some examples, video encoder 20 may entropy encode the NSST index. As part of entropy encoding the NSST index, video encoder 20 may binarize the NSST index. For entropy coding the NSST index, a fixed-length code may be used for binarization or a variable length code, such as a truncated unary code or an exponential Golomb code, may be used for binarization.

In accordance with a fifth technique, if the energy of a residual signal is limited, video encoder 20 may skip, for certain TUs, the signaling of the NSST index and the secondary transform may not be applied. For example, video encoder 20 may skip signaling of the NSST index for a current TU if there is no non-zero coefficient transmitted for the current TU. In other words, video encoder 20 may skip encoding of data indicative of the NSST index for the current TU if there is no non-zero coefficient encoded for the current TU. Similarly, in other examples, skipping of NSST index signaling may apply to LCU, CU, PU, or any other block level syntax element. Thus, in accordance with the fifth technique, video encoder 20 may generate, in an encoded bitstream of the video data, data indicative of an index applicable to a TU, a PU, a CU, or a combination thereof, the index indicating the selected candidate is the second transform.

Similarly, video decoder 30 may obtain, from the bitstream of the video data, a syntax element indicative of an index applicable to a TU, a PU, a CU, or a combination thereof. In this example, video decoder 30 may select the candidate from the subset of non-separable transforms comprises selecting, as the first inverse transform, a candidate indicated by the index.

In some examples, the NSST index at a certain block level is skipped and the secondary transform is not applied if a total number or a total absolute sum or a sum of squared values of nonzero coefficients transmitted at that certain block level is no greater than a given threshold value. For example, video encoder 20 may skip signaling of the NSST index and not apply the secondary transform when the total number of nonzero coefficients transmitted at a certain LCU is no greater than 10. In some examples, video encoder 20 may skip signaling of the NSST index and not apply the secondary transform when the total absolute sum of nonzero coefficients transmitted at a certain CU is no greater than 100. In an example, video encoder 20 may skip signaling of the NSST index and not apply the secondary transform when the sum of squared values of nonzero coefficients transmitted at a certain PU is no greater than 100.

Thus, in accordance with the fifth technique, video encoder 20 may determine whether to encode an index of a secondary transform (e.g., non-separable secondary transform 106) in a bitstream. The index of the secondary transform may identify the secondary transform from among a plurality of available secondary transforms. In this example, video encoder 20 may make a determination that the index of the secondary transform is not encoded in the bitstream based on a sum of a total number, a total absolute sum, or sum of squared values of nonzero coefficients transmitted at a particular block level (e.g., in a LCU, CU, PU, TU) being no greater than a given threshold value. In this example, video encoder 20 may signal the index of the secondary transform at the particular block level. In this example, video encoder 20 may apply to at least part of a 2-dimensional coefficient block the secondary transform whose index is signaled in the bitstream.

Similarly, video decoder 30 may determine whether an index of a secondary transform (e.g., non-separable inverse transform 158) is signaled in a bitstream. In this example, video decoder 30 may make a determination that the index of the secondary transform is not encoded in the bitstream based on a sum of a total number, a total absolute sum, or sum of squared values of nonzero coefficients at a particular block level being no greater than a given threshold value. In this example, the index of the secondary transform is signaled at the particular block level. In this example, video decoder 30 may apply to the 1-dimensional coefficient vector a secondary inverse transform that is inverse of the secondary transform indicated by the index signaled in the bitstream.

In one example, video decoder 30 may apply a secondary inverse transform to a 1-dimensional coefficient vector in response to video encoder 20 determining that the quantity of non-zero coefficients of a 2-dimensional coefficient block is no greater than a threshold. In this example, the threshold may be different for different block sizes, different intra prediction modes, or a combination thereof for the video data.

Similarly, video encoder 20 may determine whether a quantity of non-zero coefficients of a 2-dimensional coefficient block is greater than a threshold. In this example, video encoder 20 may apply a secondary transform to at least part of the 2-dimensional coefficient block in response to determining that the quantity of non-zero coefficients of the 2-dimensional coefficient block is no greater than the threshold. In this example, the threshold may be different for different block sizes, different intra prediction modes, or a combination thereof for the video data.

In some examples, the threshold value of the total number of nonzero coefficients is 1. In an example, the threshold value for the total number of non-zero coefficients may be different for different block sizes or different intra prediction modes.

In some examples, video encoder 20 and video decoder 30 may apply secondary transforms and secondary inverse transforms to coefficient values for all color components (e.g., Y, Cb, and Cr). In other examples, video encoder 20 and video decoder 30 may apply secondary transforms and secondary inverse transforms to some but not all color components. For example, video encoder 20 and video decoder 30 may apply secondary transforms and secondary inverse transforms to coefficient values for the luma (i.e., Y) component, but not to coefficient values for chroma (e.g., Cb and Cr) components. In examples where video encoder 20 and video decoder 30 apply secondary transforms and secondary inverse transforms to two or more color components, the NSST index may be shared for the two or more color components.

In accordance with an example of the fifth technique, if the NSST index is signaled at a certain block level and shared for several components (e.g., Y, Cb, Cr) and if a sum of the total number or if the total absolute sum or if the sum of squared values of nonzero coefficients transmitted at that certain block level from all the components sharing the same NSST index is no greater than a given threshold value, the NSST index may be skipped and the secondary transform is not applied. In an example, the threshold value of total number of nonzero coefficients is 1, 2, or 3. In some examples, the threshold value of the total number of nonzero coefficients is greater than 3.

In an example, if the NSST index is signaled at a certain block level and shared for Y, Cb, and Cr components, then the NSST index may be skipped and the secondary transform may not be applied if a sum of total number of nonzero coefficients of Y, Cb, and Cr components is less than a given threshold. For example, video encoder 20 may skip signaling of the NSST index and not apply the secondary transform when the absolute sum of nonzero coefficients transmitted at a certain CU for the combination of Y, Cb, and Cr components is no greater than 100.

In an example, if the NSST index is signaled at a certain block level and shared for Cb and Cr components, then video encoder 20 may skip signaling of the NSST index and not apply the secondary transform if a sum of a total number of nonzero coefficients of Cb and Cr components is less than a given threshold. For example, video encoder 20 may skip signaling of the NSST index and not apply the secondary transform when the total number of nonzero coefficients for Cb and Cr components of a certain CU is no greater than 3.

In accordance with some examples of the fifth technique, the threshold value for the total number of nonzero coefficients may be different for different block sizes or different intra prediction modes. For example, a LCU may have a greater threshold value than CU and PU. Similarly, video encoder 20 may use a first threshold value for blocks coded using vertical intra prediction modes and may use a second, different threshold value for blocks coded using horizontal intra prediction modes.

In an example of the fifth technique, if the NSST index is signaled at a certain block level and shared for Y, Cb, and Cr components, then the NSST index may be skipped and the secondary transform may not be applied if a total number of nonzero coefficients of only the Y component is less than a given threshold. For example, video encoder 20 may skip signaling of the NSST index and not apply the secondary transform when the total number of nonzero coefficients transmitted at a certain a CU for only the Y component is no greater than 1, 2, 3, or another threshold value.

In an example, if the NSST index is signaled at a certain block level and shared for Cb and Cr components, then the NSST index may be skipped and the secondary transform may not be applied if a total number of nonzero coefficients of only the Cb component is less than a given threshold. For example, video encoder 20 may skip signaling of the NSST index and not apply the secondary transform when the total number of nonzero coefficients transmitted at a certain a CU for only the Cb component is no greater than 1, 2, 3, or another threshold value. Similarity, video encoder 20 may skip signaling of the NSST index and not apply the secondary transform when the total number of nonzero coefficients transmitted at a certain a CU for only the Cr component is no greater than 1, 2, 3, or another threshold value.

Additionally, or alternatively, in some examples of the fifth technique, the threshold value for a total number of nonzero coefficients may be different for different block sizes or different intra prediction modes. Said differently, an LCU may have a greater threshold value than CU and PU. Similarly, a 16×16 chroma prediction mode may have a greater threshold value than a 4×4 chroma prediction mode. For example, video encoder 20 may use a first threshold value for blocks coded using vertical intra prediction modes and may use a second, different threshold value for blocks coded using horizontal intra prediction modes.

In an example of the fifth technique, when the size of LCU, CU, PU, or other type of block is greater than or smaller than a pre-defined threshold value, or within a given threshold value range, signaling of the NSST index may be skipped and no secondary transform is applied. For example, video encoder 20 may skip generating, in an encoded video bitstream, data indicative of the NSST index and not apply the secondary transform when a size of a CU is smaller than a predefined value of 8×8.

In an example of the fifth technique, when the TU is coded using a transform skip mode, the signaling of the NSST index may be skipped and no secondary transform is applied. Said differently, video encoder 20 may skip generating, in an encoded video bitstream, data indicative of the NSST index and the secondary transform is not applied when a TU is coded using transform skip mode.

For example, video encoder 20 may determine whether to signal (e.g., encode data indicative of) an index of a secondary transform in a bitstream based on a TU being coded in a transform skip mode. In this example, video encoder 20 generates, in an encoded video bitstream, data indicative of the index of a secondary transform in the bitstream and video encoder 20 may apply the secondary transform to at least part of the first 2-dimensional coefficient block based on data indicative of the index of the second transform being encoded in the bitstream. Similarly, video decoder 30 may determine whether an index of a secondary transform is signaled in a bitstream based on a TU being coded in a transform skip mode. Said differently, video decoder 30 may apply to a 1-dimensional coefficient vector a secondary inverse transform indicated by the index of the secondary transform.

Furthermore, in some examples of the fifth technique, when a block (e.g., TU) is coded using a secondary transform, the transform skip mode may not be signaled. Said differently, video encoder 20 may generate, in an encoded video bitstream, data indicative one of the transform skip mode and the secondary transform. For example, video encoder 20 may generate, in an encoded video bitstream, data indicative of the transform skip mode and omit signaling the secondary transform. Similarly, video encoder 20 may omit generating, in an encoded video bitstream, data indicative the transform skip mode and generates, in an encoded video bitstream, data indicative of the secondary transform.

In accordance with a sixth technique of this disclosure, for a particular coding mode, the secondary transform may be disabled and/or not signaled, and vice versa. For instance, such coding modes may include, but are not necessarily limited to, transform skip mode, linear method (LM) mode, cross-component residual prediction mode, and so on. Thus, if the secondary transform is applied, a particular coding mode may be disabled and/or not signaled. For example, in some instances, transform skip mode, LM mode, and cross-component residual prediction mode may be disabled and/or indexes of transform skip mode, LM mode, and cross-component residual prediction mode are not encoded when the secondary transform is applied. Similarly, the secondary transform may be disabled and/or not signaled when one or more of the transform skip mode, LM mode, and cross-component residual prediction mode is used. In general, adaptive cross-component residual prediction may include predicting the residual of one color component (e.g., Y, Cr, or Cb) from the residual of another color component for the same block.

In an example of the sixth technique, when a secondary transform is enabled, the particular mode may always be disabled. For example, based on the secondary transform being enabled, transform skip mode is disabled.

In an example of the sixth technique, when a secondary transform is enabled, the particular mode may be disabled for some conditions but enabled for other conditions. The conditions may include, but are not limited to, block size, number of non-zero transform coefficients, whether coding is for the luma or chroma component, the neighboring prediction modes, and other conditions, and vice versa.

In an example of the sixth technique, the particular prediction mode may still be enabled when a secondary transform is applied, but context modeling used for signaling this particular prediction mode may be modified such that the context modeling depends on the signaled secondary index/flag. Said differently, a particular prediction mode may be permitted to be applied when a secondary transform is applied but a context modeling for the particular prediction mode is modified.

In an example, a secondary transform is still enabled for a particular prediction mode, but the context modeling used for signaling the secondary transform may be modified such that the context modeling depends on whether the particular prediction mode is applied. Said differently, rather than disabling prediction modes that are not applied by video encoder 20 and/or video decoder 30, a particular prediction mode may be permitted to be used when a secondary transform is applied but context modeling for the particular prediction mode is modified.

In accordance with a seventh example of this disclosure, when applying a secondary transform on other non-luma components (e.g., chroma) and when the secondary transform selection has some dependency on certain coded information, the NSST index value may be inherited (e.g., reused) from a co-located luma component and not encoded for non-luma components. Examples of such coded information, may include, but are not limited to, intra prediction modes. As used herein, co-located may refer to the components of the same block. In aspects of this example, the dependency on certain coded information is done in a way that the coded information of the non-luma components is used instead of inheriting the coded information of the co-located luma components.

In an example, when a secondary transform is performed for the chroma component (e.g., the Cr component and/or the Cb component), and video decoder 30 selects the secondary transform based on the signaled NSST index and intra prediction mode, then for the chroma component, video decoder 30 may select the secondary transform based on the NSST index of the co-located luma component and intra prediction mode of the current chroma component.

When the intra prediction mode of the chroma component is inherited from the co-located luma component (e.g., the Y component), then the intra prediction mode of the co-located luma component may be used for selecting the secondary transform. For example, video decoder 30 may select the secondary transform candidate from a subset based on the NSST index of the co-located luma component and intra prediction mode of the co-located luma component.

In an example, when the intra prediction mode of the chroma component is a LM mode, e.g., as described in U.S. patent application Ser. No. 15/006,994, the secondary transform may not be applied for the chroma component. For example, video decoder 30 may apply the secondary transform candidate for the co-located luma component and refrain from applying the secondary transform candidate for the chroma component.

In an example, when the secondary transform is applied, LM mode may not be applied or signaled. In this case, the intra mode coding may be modified accordingly such that the LM mode is not a candidate intra mode to be signaled. Such intra mode coding modification may include, but is not limited to: reducing the number of available intra modes to be coded, or replacing the LM modes with other intra prediction modes so that the total number of available intra modes is the same. Said differently, when the secondary transform is applied, a signaling of the intra mode may be modified to no longer signal the LM mode, because the LM modes may be presumed to not be a candidate intra modes when the secondary transform is applied.

Additionally, or alternatively, when the intra prediction mode of the chroma component is an LM mode, the secondary transform may be selected using the inherited NSST index and planar/DC mode for the chroma component. For example, video decoder 30 may select the secondary transform candidate from a subset based on the NSST index of the co-located luma component and planar/DC mode of the chroma component.

In an example, both the NSST index and the intra prediction mode of the co-located luma component may be inherited for the current non-luma component. For example, video decoder 30 may select the secondary transform candidate from a subset based on the NSST index of the co-located non-luma component and intra prediction mode of the co-located non-luma component.

FIG. 7A is an illustration of an example mapping from luma intra mode to transform set index. The examples described below may be performed by video encoder 20 and/or video decoder 30. As illustrated in FIG. 7A, the example described below may be implemented on top of 67 luma intra prediction modes, including planar (0), DC (1) and 65 angular luma intra prediction modes (2-66). For selecting a transform matrix for performing the non-separable transform, a total of 12 non-separable 16×16 transform sets may be pre-defined. Each transform set contains three 16×16 transform candidates. In an example, the transform set may be specified by the luma intra prediction mode. For example, as shown in FIG. 7A, luma intra prediction mode '0' specifies transform set index '0', luma intra prediction mode '1' specifies transform set index '0', luma intra prediction mode '2' specifies transform set index '1', and so on.

In the example of FIG. 7A, the transform set may be specified and within each transform set, the selected transform from 3 candidates may be specified by the explicitly signaled CU-level ROT index. For instance, an ROT index may be an index value signaled per CU in a bitstream, and the ROT index value may range from 0 to 3. In some instances, an ROT index 0 specifies that no secondary transform is applied, and an ROT index 1~3 specifies the selected one transform from 3 different ROTs. The mapping from the luma prediction mode to the transform set index is defined in FIG. 7A.

Figure 7B:
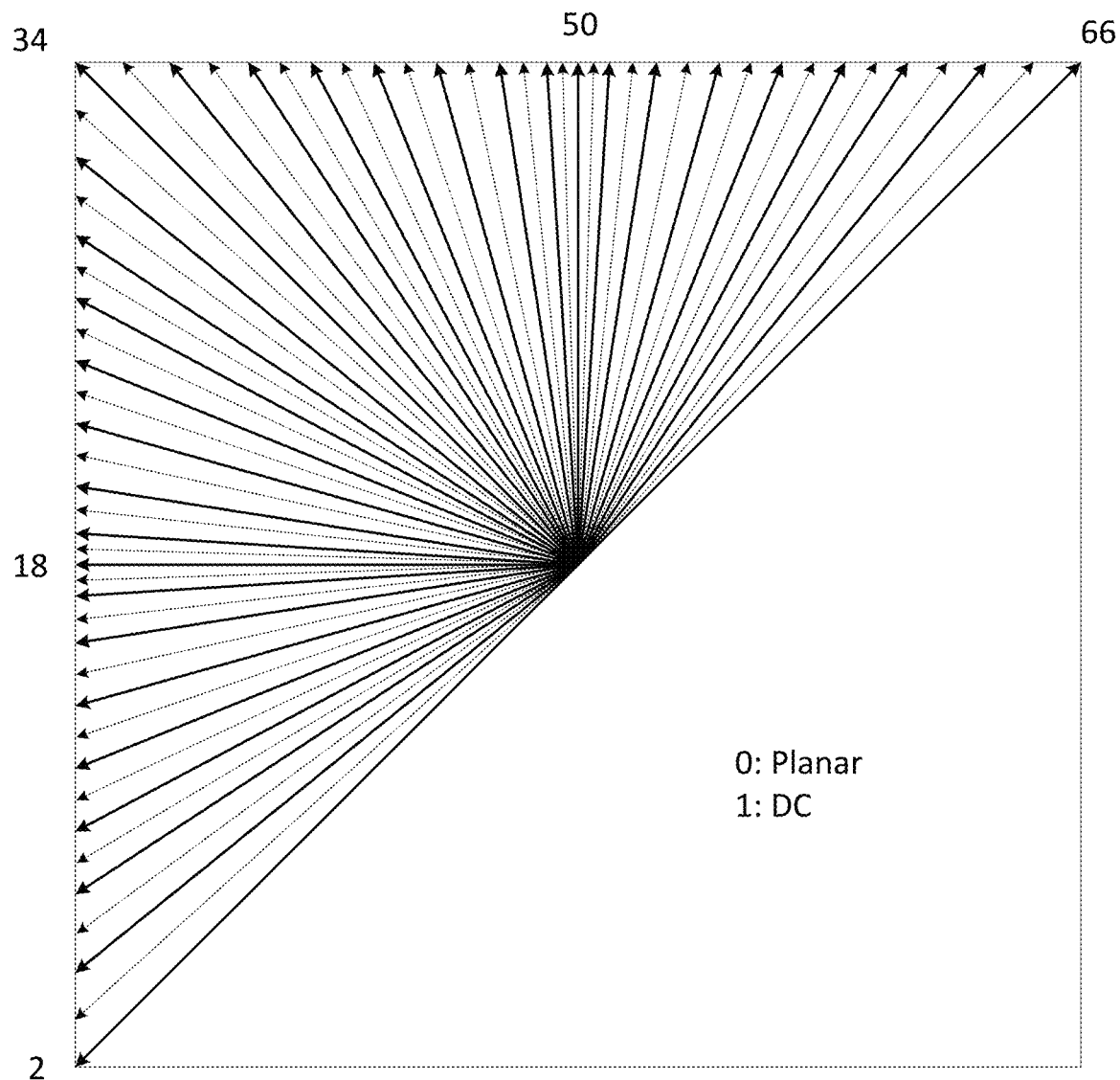
FIG. 7B is an illustration of intra prediction mode (IPM) ranges from 0 to 66.

In addition, according to FIG. 7A, for luma intra prediction modes (IPM) greater than 34, the same transform set index for the intra mode 68-IPM may be applied. However, to utilize the symmetry between intra prediction mode IPM and 68-IPM, at the encoder/decoder, the transform coefficient block may be transposed before/after doing the secondary transform. More specifically, in the example of FIG. 7B, intra prediction mode (IPM) ranges from 0 to 66. As illustrated in FIG. 7B, intra mode IPM and 68-IPM are symmetric. For instance, intra mode 18 (horizontal prediction) and 50 (vertical prediction) are symmetric. Since IPM and 68-IPM are symmetric, the non-separable transform applied on these two modes has some connection. For instance, if we transpose the residual block predicted from mode 50 (vertical prediction), the residual statistics should be very similar to the residual blocks predicted from mode 18 (horizontal prediction). Therefore, a non-separable transform for intra mode IPM should be similar to a non-separable transform for intra mode IPM plus a transpose operation. To utilize this symmetry and reduce total number of non-separable transform sets, for intra mode IPM which is greater than 34, the same transform set of 68-IPM may be used and transform coefficient block may be transposed after the secondary transform. In section 2.2.1 of JVET-C1001: http://phenix.it-sudparis.eu/jvet/doc_end_user/documents/3_Geneva/wg11/JVET-C1001-v3.zip, a 66 luma intra prediction mode is described.

In an eighth technique of this disclosure, video encoder 20 and/or video decoder 30 may be configured to apply different sizes and different shapes (other than square or non-square) of NSST for different block sizes. In an example, a 4×4 NSST may be applied for 4×4 blocks, and an 8×8 NSST may be applied on the top-left 8×8 transform coefficients for 8×8 and greater blocks. For instance, video encoder 20 may apply a 4×4 secondary transform to 4×4 blocks, may apply an 8×8 secondary transform to 8×8 blocks, and may apply an 8×8 secondary transform to the top-left 8×8 coefficients of blocks greater than 8×8. For example, video encoder 20 may apply an 8×8 secondary transform to the top-left 8×8 coefficients of a 16×16 block.

In an example of the eighth technique, when a 4×4 NSST is applied for M×N blocks, where M≥4, N≥4, M and N are multiples of 4, M N, the M×N block may be divided by multiple non-overlapped 4×4 sub-blocks. For each 4×4 sub-block, a 4×4 NSST may be applied. For example, video encoder 20 may apply a first 4×4 secondary transform to the top-left 4×4 coefficients of an 8×4 block and a second 4×4 secondary transform to the 4×4 coefficients of the 8×4 block that are below the top-left 4×4 coefficients such that video encoder 20 applies a NSST to each of the two 4×4 blocks of the 8×4 block.

For example, video encoder 20 may divide a M×N coefficient block into a plurality of non-overlapped 4×4 sub blocks. In this example, the plurality of non-overlapped 4×4 sub-blocks include a first 2-dimensional coefficient block and a second 2-dimensional coefficient block, M and N are each greater than 4, M and N are each multiples of 4, and M is not equal to N. In this example, video encoder 20 performs, for each respective 4×4 sub-block of the plurality of non-overlapped 4×4 sub blocks, a secondary transform to generate a respective coefficient block.

Similarly, video decoder 30 may divide a M×N coefficient block into a plurality of non-overlapped 4×4 sub-blocks, the plurality of non-overlapped 4×4 sub-blocks including the first 2-dimensional coefficient block, M and N are each greater than 4, M and N are each multiples of 4, and M is not equal to N. In this example, video decoder 30 may perform a 4×4 inverse NSST for each 4×4 sub-block of the multiple non-overlapped 4×4 sub blocks. In this example, for each respective 4×4 sub-block of the plurality of 4×4 sub-blocks, video decoder 30 applies an inverse secondary transform to generate a respective 2-dimension coefficient block.

In an example of the eighth technique, when an 8×8 NSST is applied for M×N blocks, where M≥8, N≥8, M and N is a multiple of 8, the M×N block may be divided into multiple non-overlapped 8×8 sub-blocks, and for each 8×8 sub-block, an 8×8 NSST may be applied. For example, video encoder 20 may apply a first 8×8 secondary transform to the top-left 8×8 coefficients of an 8×64 block and a second 8×8 secondary transform to the 8×8 coefficients of the 8×64 block that are below the top-left 8×8 coefficients, and so on such that video encoder 20 applies a NSST to each of the eight 8×8 blocks of the 8×64 block.

In an example of the eighth technique, instead of a square NSST, a NSST may be applied to a group of transform coefficients that located in an arbitrary region of a coefficient block. For example, video encoder 20 may apply a first 4×16 secondary transform to the center 4×16 coefficients of an 8×64 block. In an example, the first K transform coefficients in a coefficient scanning order may be organized into a single vector and a non-separable transform may be performed on this transform coefficient vector. In this example, the coefficient scanning order can be, but is not limited to, a diagonal scan, horizontal scan or vertical scan.

In an example of the eighth technique, for an N×N block, a zero-out NSST may be applied such that only the first M coefficients are calculated, and the remaining N-M coefficient may be considered to be zero. For instance, for a 1-dimensional coefficient vector that includes N number of coefficients, video encoder 20 may apply an NSST that calculates only the first M of the N coefficients of the 1-dimensional coefficient vector and sets the remaining (i.e., N−M) coefficients of the 1-dimensional coefficient vector to zero.

If a group of zeroed coefficients forms a coefficient group (CG), e.g., a 4×4 sub-block as defined in HEVC, when entropy coding this CG, the flag, which signals whether there is at least one non-zero coefficient in this CG, may be skipped and not coded. In some examples, instead of not coding the syntax elements for the zeroed coefficients, the syntax elements for the zeroed coefficients may still be coded but using a separate context.

Furthermore, in some examples, if a group of zeroed coefficients forms a coefficient group (CG), e.g., a 4×4 sub-block as defined in HEVC, when entropy coding this CG, the last position coding may be modified to include the restriction that the last position cannot appear in these zeroed coefficient positions.

Figure 8:
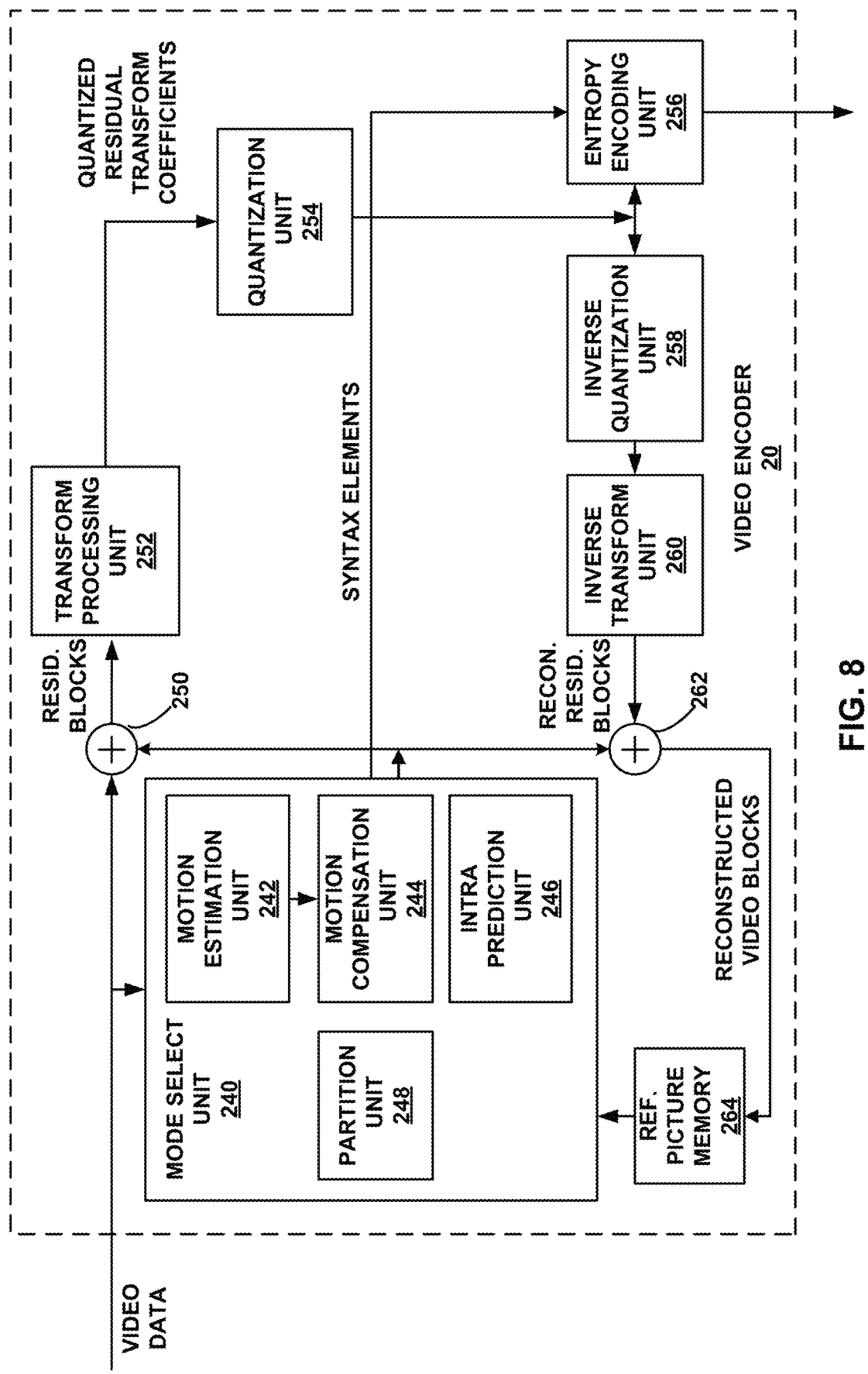
FIG. 8 is a block diagram illustrating an example of a video encoder that may implement techniques described in this disclosure.

FIG. 8 is a block diagram illustrating an example of video encoder 20 that may implement techniques described in this disclosure. In accordance with this disclosure, video encoder 20 may be configured to apply the techniques described in this disclosure, such as, for example, techniques relating to secondary transforms. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 8, video encoder 20 receives a current video block within a video frame to be encoded. In the example of FIG. 8, video encoder 20 includes mode select unit 240, reference picture memory 264 (which may also be referred to as a decoded picture buffer (DPB)), summer 250, transform processing unit 252, quantization unit 254, and entropy encoding unit 256. Mode select unit 240, in turn, includes motion compensation unit 244, motion estimation unit 242, intra-prediction unit 246, and partition unit 248. For video block reconstruction, video encoder 20 also includes inverse quantization unit 258, inverse transform unit 260, and summer 262. In some examples, a deblocking filter (not shown in FIG. 8) is also included to filter block boundaries to remove blockiness artifacts from reconstructed video. The deblocking filter filters the output of summer 262. Additional filters (in loop or post loop) may also be used in addition to the deblocking filter. Such filters are not shown for brevity, but if desired, may filter the output of summer 250 (as an in-loop filter).

During the encoding process, video encoder 20 receives a video frame or slice to be coded. The frame or slice may be divided into multiple video blocks. Motion estimation unit 242 and motion compensation unit 244 perform inter-predictive encoding of the received video block relative to one or more blocks in one or more reference frames to provide temporal prediction. Alternatively, intra-prediction unit 246 may perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 248 may partition blocks of video data into sub-blocks, based on evaluation of previous partitioning schemes in previous coding passes. For example, partition unit 248 may initially partition a frame or slice into LCUs, and partition each of the LCUs into sub-CUs based on rate-distortion analysis (e.g., rate-distortion optimization). Mode select unit 240 may further produce a quadtree data structure indicative of partitioning of an LCU into sub-CUs. Leaf-node CUs of the quadtree may include one or more PUs and one or more TUs.

Mode select unit 240 may select one of the prediction modes, intra or inter, e.g., based on error results, and provides the resulting predicted block to summer 250 to generate residual data and to summer 262 to reconstruct the encoded block for use as a reference frame. Mode select unit 240 also provides syntax elements, such as motion vectors, intra-mode indicators, partition information, and other such syntax information, to entropy encoding unit 256.

Motion estimation unit 242 and motion compensation unit 244 may be highly integrated, but are illustrated separately for conceptual purposes. Motion estimation, performed by motion estimation unit 242, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 264. For example, video encoder 20 may interpolate values of one-quarter pixel positions, one-eighth pixel positions, or other fractional pixel positions of the reference picture. Therefore, motion estimation unit 242 may perform a motion search relative to the full pixel positions and fractional pixel positions and output a motion vector with fractional pixel precision.

Motion estimation unit 242 calculates a motion vector for a PU of a video block in an inter-coded slice by comparing the position of the PU to the position of a predictive block of a reference picture. The reference picture may be selected from a first reference picture list (list 0) or a second reference picture list (list 1), each of which identify one or more reference pictures stored in reference picture memory 264. Motion estimation unit 242 sends the calculated motion vector to entropy encoding unit 256 and motion compensation unit 244.

Motion compensation, performed by motion compensation unit 244, may involve fetching or generating the predictive block based on the motion vector determined by motion estimation unit 242. Again, motion estimation unit 242 and motion compensation unit 244 may be functionally integrated, in some examples. Upon receiving the motion vector for the PU of the current video block, motion compensation unit 244 may locate the predictive block to which the motion vector points in one of the reference picture lists. Summer 250 forms a residual video block. As part of forming the residual video block, summer 250 may subtract pixel values of the predictive block from the pixel values of the current video block being coded, forming pixel difference values, as discussed below. In general, motion estimation unit 242 performs motion estimation relative to luma components, and motion compensation unit 244 uses motion vectors calculated based on the luma components for both chroma components and luma components. Mode select unit 240 may also generate syntax elements associated with the video blocks and the video slice for use by video decoder 30 in decoding the video blocks of the video slice.

Intra-prediction unit 246 may intra-predict a current block, as an alternative to the inter-prediction performed by motion estimation unit 242 and motion compensation unit 244, as described above. In particular, intra-prediction unit 246 may determine an intra-prediction mode to use to encode a current block. In some examples, intra-prediction unit 246 may encode a current block using various intra-prediction modes, e.g., during separate encoding passes, and intra-prediction unit 246 (or mode select unit 240, in some examples) may select an appropriate intra-prediction mode to use from the tested modes.

For example, intra-prediction unit 246 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 246 may calculate ratios from the distortions and rates for the various encoded blocks to determine which intra-prediction mode exhibits the best rate-distortion value for the block.

After selecting an intra-prediction mode for a block, intra-prediction unit 246 may provide information indicative of the selected intra-prediction mode for the block to entropy encoding unit 256. Entropy encoding unit 256 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block. As part of forming the residual video block, video encoder 20 may subtract the prediction data from mode select unit 240 from the original video block being coded. Summer 250 represents the component or components that perform this subtraction operation. Transform processing unit 252 applies a transform, such as a discrete cosine transform (DCT) or a conceptually similar transform, to the residual block, producing a video block comprising transform coefficient values. Wavelet transforms, integer transforms, sub-band transforms, DSTs, or other types of transforms could be used instead of a DCT. In any case, transform processing unit 252 applies the transform to the residual block, producing a block of transform coefficients. The transform may convert the residual information from a pixel domain to a transform domain, such as a frequency domain.

Additionally, as discussed above, transform processing unit 252 may be configured to apply a secondary transform that is non-separable. In some examples, transform processing unit 252 may be configured to reorganize the 1-dimensional coefficient vector formed by a secondary transform that is non-separable as a second 2-dimensional coefficient block according to a coefficient scanning order for use by quantization unit 254. Transform processing unit 252 may send the resulting transform coefficients to quantization unit 254.

Quantization unit 254 quantizes the transform coefficients to further reduce bit rate. The quantization process may reduce the bit depth associated with some or all of the coefficients. The degree of quantization may be modified by adjusting a quantization parameter.

Following quantization, entropy encoding unit 256 scans and entropy encodes syntax elements indicating the quantized transform coefficients. For example, entropy encoding unit 256 may perform CAVLC, CABAC, SBAC, PIPE coding or another entropy coding technique. In the case of context-based entropy coding, context may be based on neighboring blocks. Following the entropy coding by entropy encoding unit 256, the encoded bitstream may be transmitted to another device (e.g., video decoder 30) or archived for later transmission or retrieval.

Inverse quantization unit 258 and inverse transform unit 260 apply inverse quantization and inverse transformation, respectively, to reconstruct the residual block in the pixel domain. In particular, summer 262 adds the reconstructed residual block to the motion compensated prediction block earlier produced by motion compensation unit 244 or intra-prediction unit 246 to produce a reconstructed video block for storage in reference picture memory 264. The reconstructed video block may be used by motion estimation unit 242 and motion compensation unit 244 as a reference block to inter-code a block in a subsequent video frame.

Video encoder 20 generally uses the process discussed above to encode each block of each picture in a coded video sequence. In addition, in some examples, video encoder 20 may determine temporal layers to which to assign each of the pictures. Furthermore, video encoder 20 may be configured to encode pictures of other layers, e.g., other views, scalable video coding layers, or the like. In any case, video encoder 20 may further encode data indicating a layer to which each picture belongs, for one or more layers (e.g., of various video dimensions).

Figure 9:
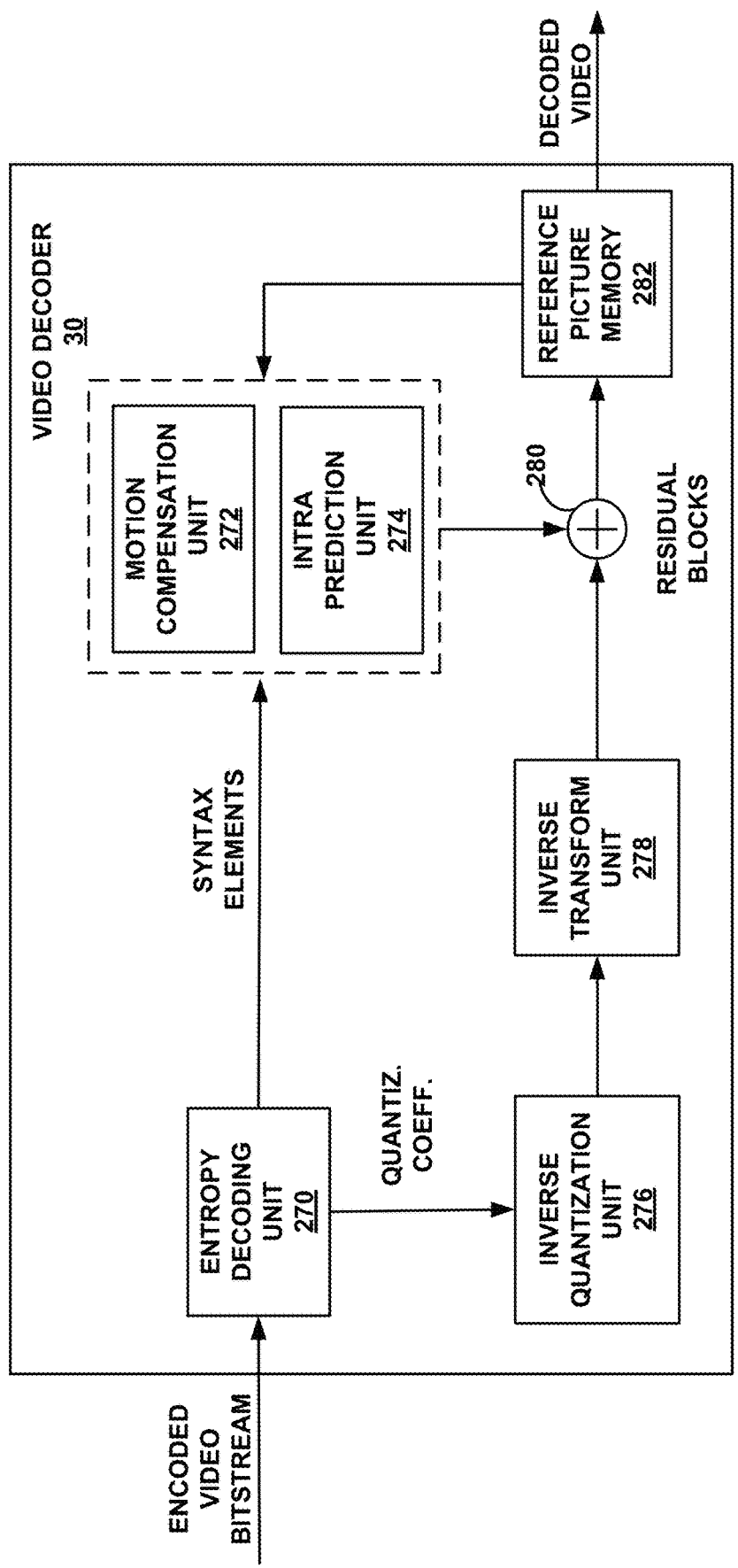
FIG. 9 is a block diagram illustrating an example of a video decoder that may implement techniques described in this disclosure.

FIG. 9 is a block diagram illustrating an example of video decoder 30 that may implement techniques described in this disclosure. In accordance with this disclosure, video decoder 30 may be configured to apply the techniques described in this disclosure, such as, for example, techniques relating to secondary transforms. In the example of FIG. 9, video decoder 30 includes an entropy decoding unit 270, motion compensation unit 272, intra prediction unit 274, inverse quantization unit 276, inverse transformation unit 278, reference picture memory 282, and summer 280. Video decoder 30 may, in some examples, perform a decoding pass generally reciprocal to the encoding pass described with respect to video encoder 20 (FIG. 8). Motion compensation unit 272 may generate prediction data based on motion vectors received from entropy decoding unit 270, while intra prediction unit 274 may generate prediction data based on intra-prediction mode indicators received from entropy decoding unit 270.

During the decoding process, video decoder 30 receives an encoded video bitstream that represents video blocks of an encoded video slice and associated syntax elements from video encoder 20. Entropy decoding unit 270 of video decoder 30 entropy decodes the bitstream to generate quantized coefficients, motion vectors or intra-prediction mode indicators, and other syntax elements. Entropy decoding unit 270 forwards the motion vectors to and other syntax elements to motion compensation unit 272. Video decoder 30 may receive the syntax elements at the video slice level and/or the video block level.

When the video slice is coded as an intra-coded (I) slice, intra prediction unit 274 may generate prediction data for a video block of the current video slice based on a signaled intra prediction mode and data from previously decoded blocks of the current frame or picture. When the video frame is coded as an inter-coded (i.e., B, P or a generalized P and B-picture (GPB)) slice, motion compensation unit 272 produces predictive blocks for a video block of the current video slice based on the motion vectors and other syntax elements received from entropy decoding unit 270. The predictive blocks may be produced from one of the reference pictures within one of the reference picture lists. Video decoder 30 may construct the reference frame lists, list 0 and list 1, using default construction techniques based on reference pictures stored in reference picture memory 282. Motion compensation unit 272 determines prediction information for a video block of the current video slice by parsing the motion vectors and other syntax elements, and uses the prediction information to produce the predictive blocks for the current video block being decoded. For example, motion compensation unit 272 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 272 may also perform interpolation based on interpolation filters. Motion compensation unit 272 may use interpolation filters as used by video encoder 20 during encoding of the video blocks to calculate interpolated values for sub-integer pixels of reference blocks. In this case, motion compensation unit 272 may determine the interpolation filters used by video encoder 20 from the received syntax elements and use the interpolation filters to produce predictive blocks.

Inverse quantization unit 276 inverse quantizes, i.e., de-quantizes, the quantized transform coefficients provided in the bitstream and decoded by entropy decoding unit 270. The inverse quantization process may include use of a quantization parameter QPY calculated by video decoder 30 for each video block in the video slice to determine a degree of quantization and, likewise, a degree of inverse quantization that should be applied.

Inverse transform unit 278 applies an inverse transform, e.g., an inverse DCT, an inverse integer transform, or a conceptually similar inverse transform process, to the transform coefficients in order to produce residual blocks in the pixel domain. Additionally, in accordance with various techniques of this disclosure, inverse transform unit 278 may be configured to apply an inverse secondary transform that is non-separable. In some examples, inverse transform unit 278 may be configured to reorganize a 1-dimensional coefficient vector as a second 2-dimensional coefficient block according to a coefficient scanning order.

After motion compensation unit 272 generates the predictive block for the current video block based on the motion vectors and other syntax elements, video decoder 30 forms a decoded video block. As part of forming the decoded video block, video decoder 30 may sum the residual blocks from inverse transform unit 278 with the corresponding predictive blocks generated by motion compensation unit 272. Summer 280 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 282, which stores reference pictures used for subsequent motion compensation. Reference picture memory 282 also stores decoded video for later presentation on a display device, such as display device 32 of FIG. 1.

Video decoder 30 generally uses the process discussed above to decode each block of each picture in a coded video sequence. In addition, in some examples, video decoder 30 may decode data indicating temporal layers to which pictures are assigned. Furthermore, video decoder 30 may be configured to decode pictures of other layers, e.g., other views, scalable video coding layers, or the like. In any case, video decoder 30 may further decode data indicating a layer to which each picture belongs, for one or more layers (e.g., of various video dimensions).

The techniques of the disclosure, which may be performed by video encoder 20 or video decoder 30, are described in more detail below.

FIG. 10A is an illustration of an example transform processing by video encoder 20, in accordance with one or more techniques described in this disclosure. In the example of FIG. 10A, transform processing unit 252 of video encoder 20 comprises a primary transform unit 802, a secondary transform unit 804, and a reorganization unit 806. Primary transform unit 802 applies a primary transform, such as, for example, DST or DCT, on a residual block to generate a 2-dimensional coefficient block. Secondary transform unit 804 applies a non-separable transform, such as a KLT, to the 2-dimensional coefficient block to generate a 1-dimensional vector. Reorganization unit 806 reorganizes the 1-dimensional vector as a 2-dimensional coefficient block. Quantization unit 254 quantizes the 2-dimensional block.

FIG. 10B is an illustration of an example transform processing by video decoder 30, in accordance with one or more techniques described in this disclosure. In the example of FIG. 10B, inverse transform unit 278 of video decoder 30 comprises a reorganizing unit 824, a secondary inverse transform unit 826, and a primary inverse transform unit 828. Inverse quantization unit 276 inverse quantizes the quantized transform coefficients provided in the bitstream and decoded by entropy decoding unit 270. Reorganizing unit 824 reorganizes the transform coefficients from a 2-dimensional coefficient block to a 1-dimensional vector. Secondary inverse transform unit 826 applies a non-separable inverse transform, such as a KLT, on the 1-dimensional vector to generate a 2-dimensional coefficient block. Primary inverse transform unit 828 applies a separable inverse transform on the 2-dimensional coefficient block to generate a residual coefficient block for video data.

Figure 11:
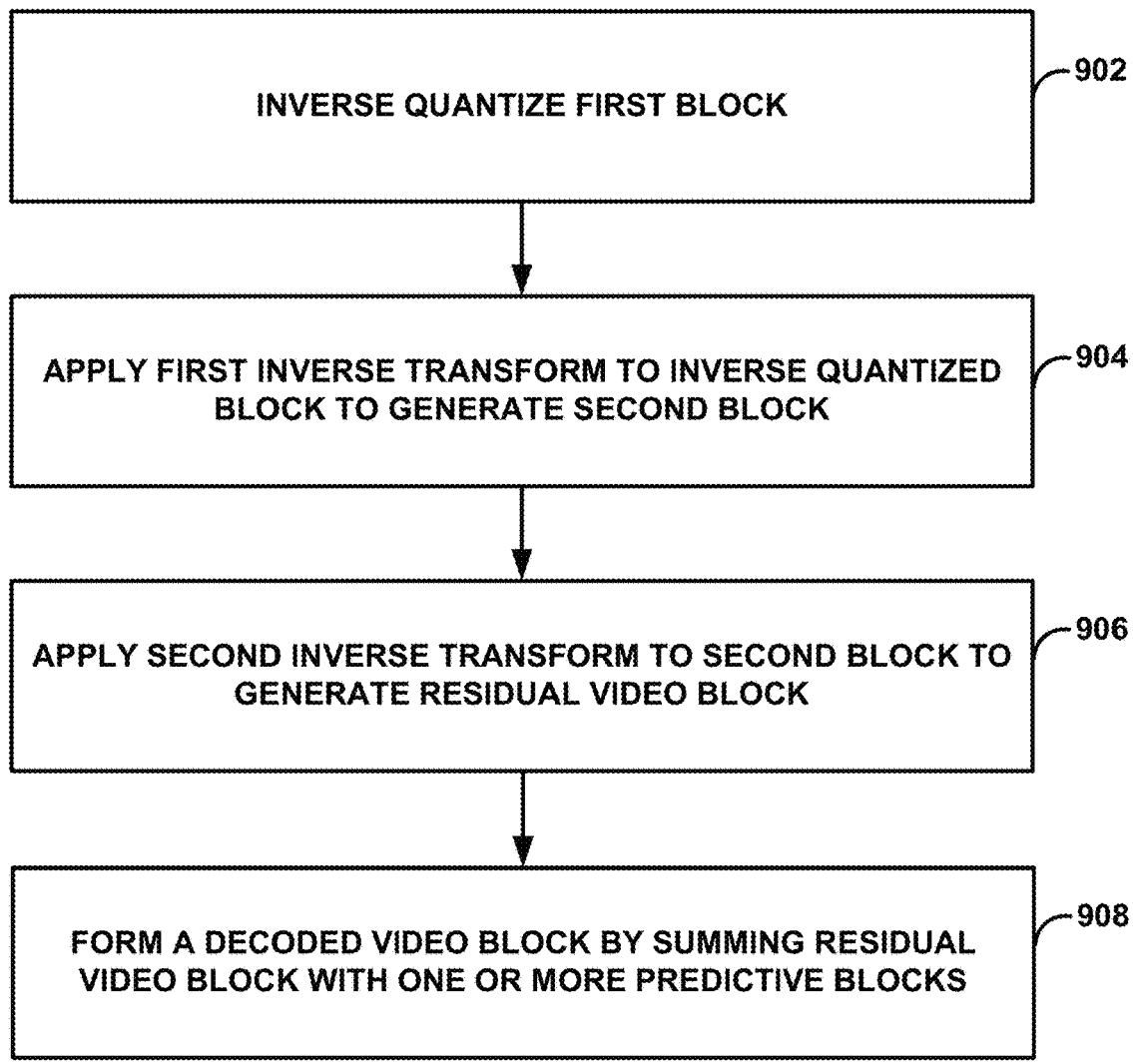
FIG. 11 is a flow diagram illustrating a first example decoding of video data that may implement techniques described in this disclosure.

FIG. 11 is a flow diagram illustrating a first example decoding of video data that may implement techniques described in this disclosure. The example techniques of FIG. 11 may be performed by video decoder 30. In the example of FIG. 11, a decoder (e.g., video decoder 30) inverse quantizes a first coefficient block (902). The decoder applies a first inverse transform to at least part of the inverse quantized first coefficient block to generate a second coefficient block (904). For example, the first inverse transform is a non-separable transform. For instance, the decoder may apply an inverse KLT on the inverse quantized first coefficient block. The decoder may apply a second inverse transform to the second coefficient block to generate a residual video block (906). The second inverse transform converts the second coefficient block from a frequency domain to a pixel domain. For instance, the decoder applies an inverse DCT or DST on the second coefficient block. The decoder forms a decoded video block (908). As part of forming the decoded video block, the decoder may sum the residual video block with one or more predictive blocks.

Figure 12:
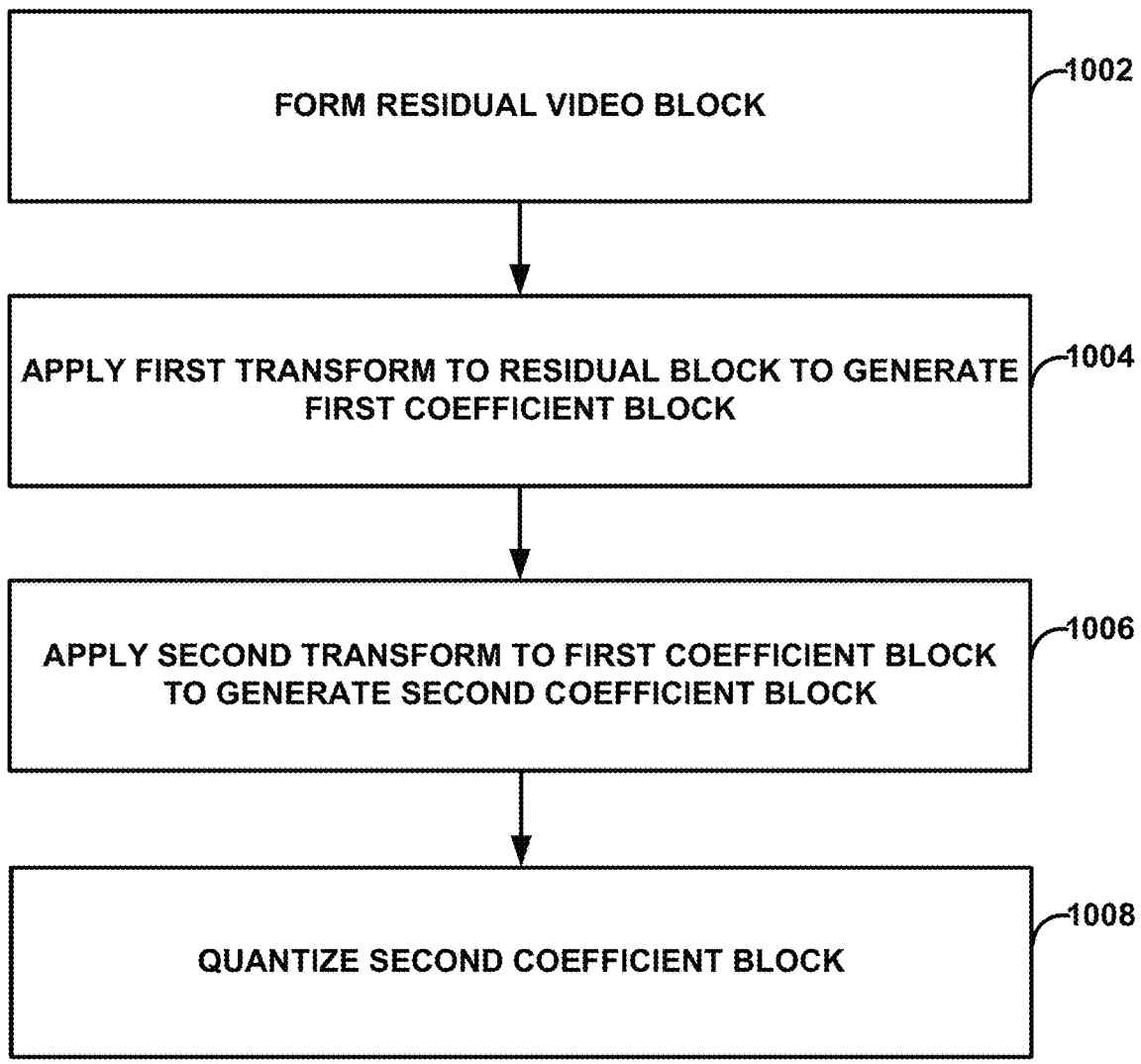
FIG. 12 is a flow diagram illustrating a first example encoding of video data that may implement techniques described in this disclosure.

FIG. 12 is a flow diagram illustrating a first example encoding of video data that may implement techniques described in this disclosure. As described, the example techniques of FIG. 12 may be performed by encoder 20. In the example of FIG. 12, an encoder (e.g., video encoder 20) forms a residual video block (1002). As part of forming the residual video block, the encoder may subtract one or more predictive blocks from a video block being coded. The encoder applies a first transform to the residual video block to generate a first coefficient block (1004). For example, the first transform converts the residual video block from a pixel domain to a frequency domain. For instance, the encoder may apply a DCT or DST on the residual video block. The encoder applies a second transform to at least part of the first coefficient block to generate a second coefficient block (1006). For example, the second transform is a non-separable transform. For instance, the encoder may apply a KLT on the second coefficient block. Next, the encoder quantizes the second coefficient block for entropy encoding (1008).

Figure 13:
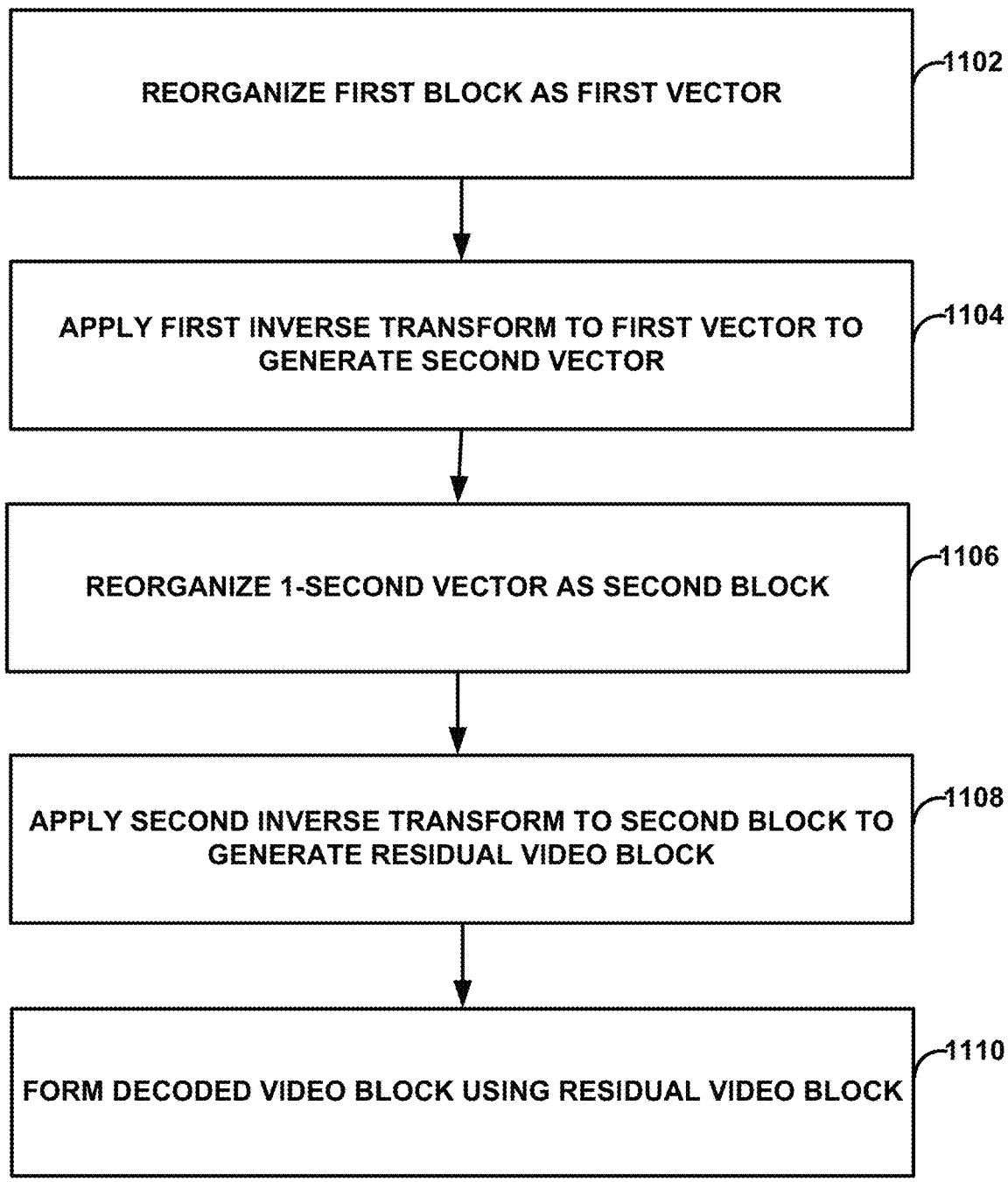
FIG. 13 is a flow diagram illustrating a second example decoding of video data that may implement techniques described in this disclosure.

FIG. 13 is a flow diagram illustrating a second example decoding of video data that may implement techniques described in this disclosure. As described, the example techniques of FIG. 13 may be performed by video decoder 30. In the example of FIG. 13, a decoder (e.g., video decoder 30) reorganizes a first 2-dimensional coefficient block as a first 1-dimensional coefficient vector according to a coefficient scanning order (1102). For example, the decoder reorganizes the first 2-dimensional coefficient block according to a coefficient scanning order in which coefficients in the first 2-dimensional coefficient block with smaller index values are placed at smaller scanning index positions in the first 1-dimensional coefficient vector. Next, the decoder applies a first inverse transform to the first 1-dimensional coefficient vector to generate a second 1-dimensional coefficient block (1104). The first inverse transform is a non-separable transform. For instance, the decoder applies an inverse KLT on the 1-dimensional coefficient vector. The decider reorganizes the second 1-dimensional coefficient block as a second 2-dimensional coefficient vector according to a coefficient scanning order (1106). Next, the decoder applies a second inverse transform to the second 2-dimensional coefficient block to generate a residual video block (1108). For example, the second inverse transform converts the second 2-dimensional coefficient block from a frequency domain to a pixel domain. For instance, the decoder applies an inverse DCT or DST on the second 2-dimensional coefficient block. The decoder forms a decoded video block (1110). As part of forming the decoded block, the decoder may sum the residual video block with one or more predictive blocks.

Figure 14:
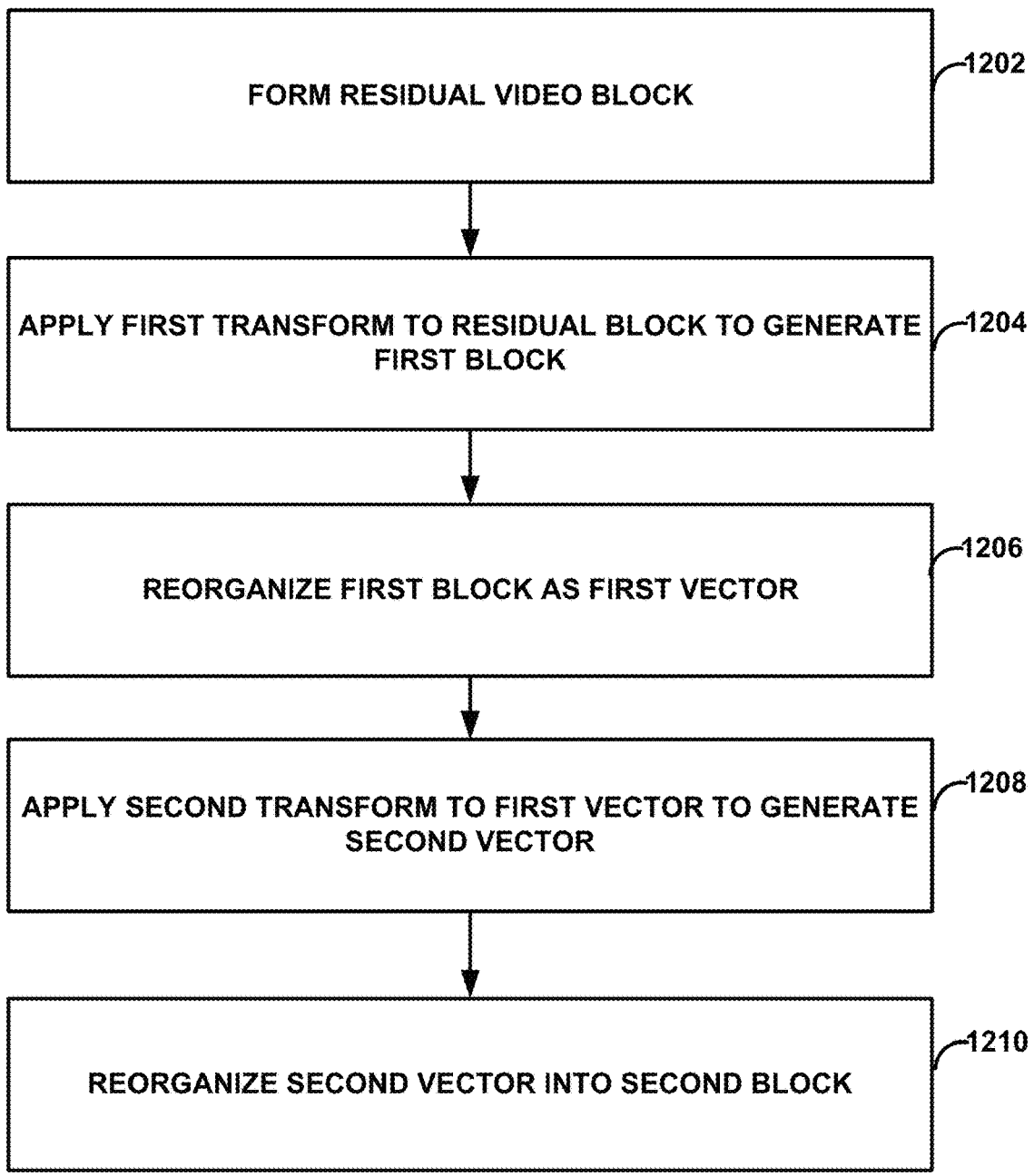
FIG. 14 is a flow diagram illustrating a second example encoding of video data that may implement techniques described in this disclosure.

FIG. 14 is a flow diagram illustrating a second example encoding of video data that may implement techniques described in this disclosure. As described, the example techniques of FIG. 14 may be performed by video encoder 20. In the example of FIG. 14, an encoder (e.g., video encoder 20) forms a residual video block (1202). As part of forming the residual video block, the encoder may subtract one or more predictive blocks from a video block being coded. The encoder applies a first transform to at least part of the residual video block to generate a first 2-dimensional coefficient block (1204). For example, the first transform converts the residual video block from a pixel domain to a frequency domain. For instance, the encoder applies a DCT or DST on the residual video block. The encoder reorganizes the first 2-dimensional coefficient as a first 1-dimensional coefficient vector (1206). Next, the encoder applies a second transform to at least part of the first 1-dimensional coefficient block to generate a second 1-dimensional coefficient vector (1208). For example, the second transform is a non-separable transform. For instance, the encoder applies a KLT on the first 1-dimensional coefficient block. Next, the encoder reorganizes the second 1-dimensional coefficient vector as a second 2-dimensional coefficient block according to a coefficient scanning order (1210). For example, the decoder reorganizes the 1-dimensional coefficient vector according to a coefficient scanning order in which coefficients in the second 1-dimensional coefficient vector with smaller index values are placed at smaller scanning index positions in the second 2-dimensional coefficient block for quantizing and entropy encoding.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   inverse quantizing a first coefficient block for a transform unit of a first video block of the video data to generate an inverse quantized first coefficient block for the transform unit of the first video block;
   applying a first inverse transform to at least part of the inverse quantized first coefficient block for the transform unit of the first video block to generate a second coefficient block for the transform unit of the first video block, the first inverse transform being a non-separable transform signaled by a Non-Separable Secondary Transform (NSST) index for the transform unit of the first video block;
   generating a residual video block for the first video block, wherein generating the residual video block for the first video block comprises applying a second inverse transform to the second coefficient block for the transform unit of the first video block, the second inverse transform converting the second coefficient block for the first video block from a frequency domain to a pixel domain;
   forming a decoded video block for the first video block, wherein forming the decoded video block for the first video block comprises summing the residual video block for the first video block with one or more predictive blocks for the first video block;
   inverse quantizing a first coefficient block for a transform unit of a second video block of the video data to generate an inverse quantized second coefficient block for the transform unit of the second video block;
   based on the transform unit of the second video block being encoded in transform skip mode, determining that signaling of an NSST index for the transform unit of the second video block is skipped and that the first inverse transform is not applied for the transform unit of the second video block;
   generating a residual video block for the second video block, wherein generating the residual video block for the second video block comprises applying the second inverse transform to the inverse quantized second coefficient block for the transform unit of the second video block; and
   forming a decoded video block for the second video block, wherein forming the decoded video block for the second video block comprises summing the residual video block for the second video block with one or more predictive blocks for the second video block.

2. The method of claim 1, wherein applying the first inverse transform comprises applying a rotational transform to at least part of the inverse quantized first coefficient block for the transform unit of the first video block.

3. The method of claim 1, wherein applying the first inverse transform comprises applying the first inverse transform to each 4×4 sub-block of the inverse quantized first coefficient block for the transform unit of the first video block.

4. A method for encoding video data, the method comprising:
   forming a residual video block for a first video block of the video data, wherein forming the residual video block for the first video block comprises subtracting one or more predictive blocks for the first video block from the first video block;
   generating a first coefficient block for a transform unit of the first video block, wherein generating the first coefficient block for the transform unit of the first video block comprises applying a first transform to the residual video block for the first video block, the first transform converting the residual video block for the first video block from a pixel domain to a frequency domain;
   applying a second transform to at least part of the first coefficient block for the transform unit of the first video block to generate a second coefficient block for the transform unit of the first video block, the second transform being a non-separable transform signaled by a Non-Separable Secondary Transform (NSST) index for the transform unit of the first video block;
   quantizing the second coefficient block for the transform unit of the first video block;
   forming a residual video block for a second video block of the video data, wherein forming the residual video block for the second video block comprises subtracting one or more predictive blocks for the second video block from the second video block;
   generating a first coefficient block for a transform unit of the second video block, wherein generating the first coefficient block for the transform unit of the second video block comprises applying the first transform to the residual video block for the second video block;
   based on the transform unit of the second video block being encoded in transform skip mode, determining that signaling of the NSST index for the second video block is skipped and that the second transform is not applied for the transform unit of the second video block; and
   quantizing the first coefficient block for the transform unit of the second video block.

5. The method of claim 4, wherein applying the second transform comprises applying a rotational transform to at least part of the first coefficient block for the transform unit of the first video block.

6. The method of claim 4, wherein applying the second transform comprises applying the second transform to each 4×4 sub-block of the first coefficient block for the transform unit of the first video block.

7. An apparatus for decoding video data comprising:
   a memory configured to store the video data; and
   a video decoder implemented in circuitry and configured to:
      inverse quantize a first coefficient block for a transform unit of a first video block of the video data to generate an inverse quantized first coefficient block for the transform unit of the first video block;
      apply a first inverse transform to at least part of the inverse quantized first coefficient block for the transform unit of the first video block to generate a second coefficient block for the transform unit of the first video block, the first inverse transform being a non-separable transform signaled by a Non-Separable Secondary Transform (NSST) index for the transform unit of the first video block;
      generate a residual video block for the first video block, wherein, to generate the residual video block for the first video block, the video decoder is configured to apply a second inverse transform to the second coefficient block for the transform unit of the first video block, the second inverse transform converting the second coefficient block for the first video block from a frequency domain to a pixel domain;
      form a decoded video block for the first video block, wherein, to form the decoded video block for the first video block, the video decoder is configured to sum the residual video block for the first video block with one or more predictive blocks for the first video block;
      inverse quantize a first coefficient block for a transform unit of a second video block of the video data to generate an inverse quantized second coefficient block for the transform unit of the second video block;
      based on the transform unit of the second video block being encoded in transform skip mode, determine that signaling of an NSST index for the transform unit of the second video block is skipped and that the first inverse transform is not applied for the transform unit of the second video block;
      generate a residual video block for the second video block, wherein, to generate the residual video block for the second video block, the video decoder is configured to apply the second inverse transform to the inverse quantized second coefficient block for the transform unit of the second video block; and
      form a decoded video block for the second video block, wherein, to form the decoded video block for the second video block, the video decoder is configured to sum the residual video block for the second video block with one or more predictive blocks for the second video block.

8. The apparatus of claim 7, wherein, to apply the first inverse transform, the video decoder is configured to apply a rotational transform to at least part of the inverse quantized first coefficient block for the transform unit of the first video block.

9. The apparatus of claim 7, wherein, to apply the first inverse transform, the video decoder is configured to apply the first inverse transform to each 4×4 sub-block of the inverse quantized first coefficient block for the transform unit of the first video block.

10. The apparatus of claim 7, wherein the apparatus comprises one or more of a camera, a computer, a mobile device, a broadcast receiver device, or a set-top box.

11. An apparatus for encoding video data comprising:
   a memory configured to store the video data; and
   a video encoder implemented in circuitry and configured to:
      form a residual video block for a first video block of the video data, wherein, to form the residual video block for the first video block, the video encoder is configured to subtract one or more predictive blocks for the first video block from the first video block;

generate a first coefficient block for a transform unit of the first video block, wherein, to generate the first coefficient block for the transform unit of the first video block, the video encoder is configured to apply a first transform to the residual video block for the first video block, the first transform converting the residual video block for the first video block from a pixel domain to a frequency domain;

apply a second transform to at least part of the first coefficient block for the transform unit of the first video block to generate a second coefficient block for the transform unit of the first video block, the second transform being a non-separable transform signaled by a Non-Separable Secondary Transform (NSST) index for the transform unit of the first video block;

quantize the second coefficient block for the transform unit of the first video block;

form a residual video block for a second video block of the video data, wherein, to form the residual video block for the second video block, the video encoder is configured to subtract one or more predictive blocks for the second video block from the second video block;

generate a first coefficient block for a transform unit of the second video block, wherein, to generate the first coefficient block for the transform unit of the second video block, the video encoder is configured to apply the first transform to the residual video block for the second video block;

based on the transform unit of the second video block being encoded in transform skip mode, determine that signaling of the NSST index for the second video block is skipped and that the second transform is not applied for the transform unit of the second video block; and quantize the first coefficient block for the transform unit of the second video block.

12. The apparatus of claim 11, wherein, to apply the second transform, the video encoder is configured to apply a rotational transform to at least part of the first coefficient block for the transform unit of the first video block.

13. The apparatus of claim 11, wherein, to apply the second transform, the video encoder is configured to apply the second transform to each 4×4 sub-block of the first coefficient block for the transform unit of the first video block.

14. An apparatus for decoding video data comprising:
means for inverse quantizing a first coefficient block for a transform unit of a first video block of the video data to generate an inverse quantized first coefficient block for the transform unit of the first video block;

means for applying a first inverse transform to at least part of the inverse quantized first coefficient block for the transform unit of the first video block to generate a second coefficient block for the transform unit of the first video block, the first inverse transform being a non-separable transform signaled by a Non-Separable Secondary Transform (NSST) index for the transform unit of the first video block;

means for generating a residual video block for the first video block, wherein the means for generating the residual video block for the first video block comprises means for applying a second inverse transform to the second coefficient block for the transform unit of the first video block, the second inverse transform converting the second coefficient block for the first video block from a frequency domain to a pixel domain;

means for forming a decoded video block for the first video block, wherein the means for forming the decoded video block for the first video block comprises means for summing the residual video block for the first video block with one or more predictive blocks for the first video block;

means for inverse quantizing a first coefficient block for a transform unit of a second video block of the video data to generate an inverse quantized second coefficient block for the transform unit of the second video block;

means for determining, based on the transform unit of the second video block being encoded in transform skip mode, that signaling of an NSST index for the transform unit of the second video block is skipped and that the first inverse transform is not applied for the transform unit of the second video block;

means for generating a residual video block for the second video block, wherein the means for generating the residual video block for the second video block comprises means for applying the second inverse transform to the inverse quantized second coefficient block for the transform unit of the second video block; and means for forming a decoded video block for the second video block, wherein the means for forming the decoded video block for the second video block comprises means for summing the residual video block for the second video block with one or more predictive blocks for the second video block.

15. The apparatus of claim 14, wherein the means for applying the first inverse transform comprises means for applying a rotational transform to at least part of the inverse quantized first coefficient block for the transform unit of the first video block.

16. The apparatus of claim 14, wherein the means for applying the first inverse transform comprises means for applying the first inverse transform to each 4×4 sub-block of the inverse quantized first coefficient block for the transform unit of the first video block.

17. A non-transitory computer-readable storage medium storing instructions that, when executed, cause one or more processors of a device for decoding video data to:
inverse quantize a first coefficient block for a transform unit of a first video block of the video data to generate an inverse quantized first coefficient block for the transform unit of the first video block;

apply a first inverse transform to at least part of the inverse quantized first coefficient block for the transform unit of the first video block to generate a second coefficient block for the transform unit of the first video block, the first inverse transform being a non-separable transform signaled by a Non-Separable Secondary Transform (NSST) index for the transform unit of the first video block;

generate a residual video block for the first video block, wherein the instructions that cause the one or more processors to generate the residual video block for the first video block cause the one or more processors to apply a second inverse transform to the second coefficient block for the transform unit of the first video block, the second inverse transform converting the second coefficient block for the first video block from a frequency domain to a pixel domain;

form a decoded video block for the first video block, wherein the instructions that cause the one or more processors to form the decoded video block for the first video block cause the one or more processors to sum the residual video block for the first video block with one or more predictive blocks for the first video block;

inverse quantize a first coefficient block for a transform unit of a second video block of the video data to generate an inverse quantized second coefficient block for the transform unit of the second video block;

based on the transform unit of the second video block being encoded in transform skip mode, determine that signaling of an NSST index for the transform unit of the second video block is skipped and that the first inverse transform is not applied for the transform unit of the second video block;

generate a residual video block for the second video block, wherein the instructions that cause the one or more processors to generate the residual video block for the second video block cause the one or more processors to apply the second inverse transform to the inverse quantized second coefficient block for the transform unit of the second video block; and form a decoded video block for the second video block, wherein the instructions that cause the one or more processors to form the decoded video block for the second video block cause the one or more processors to sum the residual video block for the second video block with one or more predictive blocks for the second video block.

18. The non-transitory computer-readable storage medium of claim 17, wherein the instructions that cause the one or more processors to apply the first inverse transform cause the one or more processors to apply a rotational transform to at least part of the inverse quantized first coefficient block for the transform unit of the first video block.

19. The non-transitory computer-readable storage medium of claim 17, wherein the instructions that cause the one or more processors to apply the first inverse transform cause the one or more processors to apply the first inverse transform to each 4×4 sub-block of the inverse quantized first coefficient block for the transform unit of the first video block.

* * * * *